(12) United States Patent
Nakata et al.

(10) Patent No.: US 8,570,845 B2
(45) Date of Patent: Oct. 29, 2013

(54) OPTICAL HEAD AND OPTICAL INFORMATION DEVICE

(75) Inventors: Hideki Nakata, Kyoto (JP); Hidenori Wada, Kyoto (JP); Masahito Nakao, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/635,503

(22) PCT Filed: Mar. 18, 2011

(86) PCT No.: PCT/JP2011/001613
§ 371 (c)(1),
(2), (4) Date: Sep. 17, 2012

(87) PCT Pub. No.: WO2011/118177
PCT Pub. Date: Sep. 29, 2011

(65) Prior Publication Data
US 2013/0010584 A1 Jan. 10, 2013

(30) Foreign Application Priority Data
Mar. 25, 2010 (JP) ................................. 2010-070934

(51) Int. Cl.
*G11B 7/12* (2012.01)

(52) U.S. Cl.
USPC ..................... 369/44.24; 369/94; 369/112.23

(58) Field of Classification Search
USPC ............... 369/44.41, 112.01, 112.03, 112.23, 369/44.23, 44.32, 124.12, 44.24
See application file for complete search history.

(56) References Cited

U.S. PATENT DOCUMENTS

| | | | |
|---|---|---|---|
| 5,276,349 A | | 1/1994 | Takahara |
| 5,668,786 A * | | 9/1997 | Sasaki et al. ................ 369/13.32 |
| 6,501,868 B1 * | | 12/2002 | Kitaoka et al. .................. 385/14 |
| 7,227,819 B2 * | | 6/2007 | Kadowaki et al. .......... 369/44.41 |
| 8,107,349 B2 | | 1/2012 | Kawano et al. |
| 2005/0088951 A1 * | | 4/2005 | Fukasawa et al. ....... 369/112.05 |
| 2006/0081761 A1 * | | 4/2006 | Tanigawa et al. ........... 250/201.5 |
| 2008/0123492 A1 * | | 5/2008 | Mori et al. .................. 369/53.11 |
| 2009/0129236 A1 * | | 5/2009 | Nagatomi ................ 369/112.03 |
| 2010/0103799 A1 * | | 4/2010 | Kawano et al. .......... 369/112.23 |
| 2010/0182891 A1 * | | 7/2010 | Mamiya et al. .......... 369/112.23 |
| 2010/0224767 A1 * | | 9/2010 | Kawano et al. ............... 250/216 |

FOREIGN PATENT DOCUMENTS

| | | |
|---|---|---|
| JP | 5-290404 | 11/1993 |
| JP | 5-304280 | 11/1993 |
| JP | 4434300 | 3/2010 |

OTHER PUBLICATIONS

International Search Report issued Jun. 7, 2011 in International (PCT) Application No. PCT/JP2011/001613.

* cited by examiner

*Primary Examiner* — Thomas Alunkal
(74) *Attorney, Agent, or Firm* — Wenderoth, Lind & Ponack, L.L.P.

(57) ABSTRACT

There are provided an optical head and an optical information device capable of downsizing the optical head, and capable of improving the qualities of a focus error signal, a tracking error signal, and a reproduction signal. A light detector (120) includes a light-receiving unit (121) for receiving a reflected light beam from an optical disc, and a package (125) for covering the light-receiving unit (121). The package (125) has a plurality of light guides (124) formed on a light-receiving surface on the light beam incident side of the light-receiving unit (121), and for guiding a reflected light beam to the light-receiving unit (121), and a light shield (114) for shielding a region except for a plurality of the light guides (124) from light.

14 Claims, 30 Drawing Sheets

OPTICAL AXIS

Y DIRECION
Z DIRECTION ← • → X DIRECTION

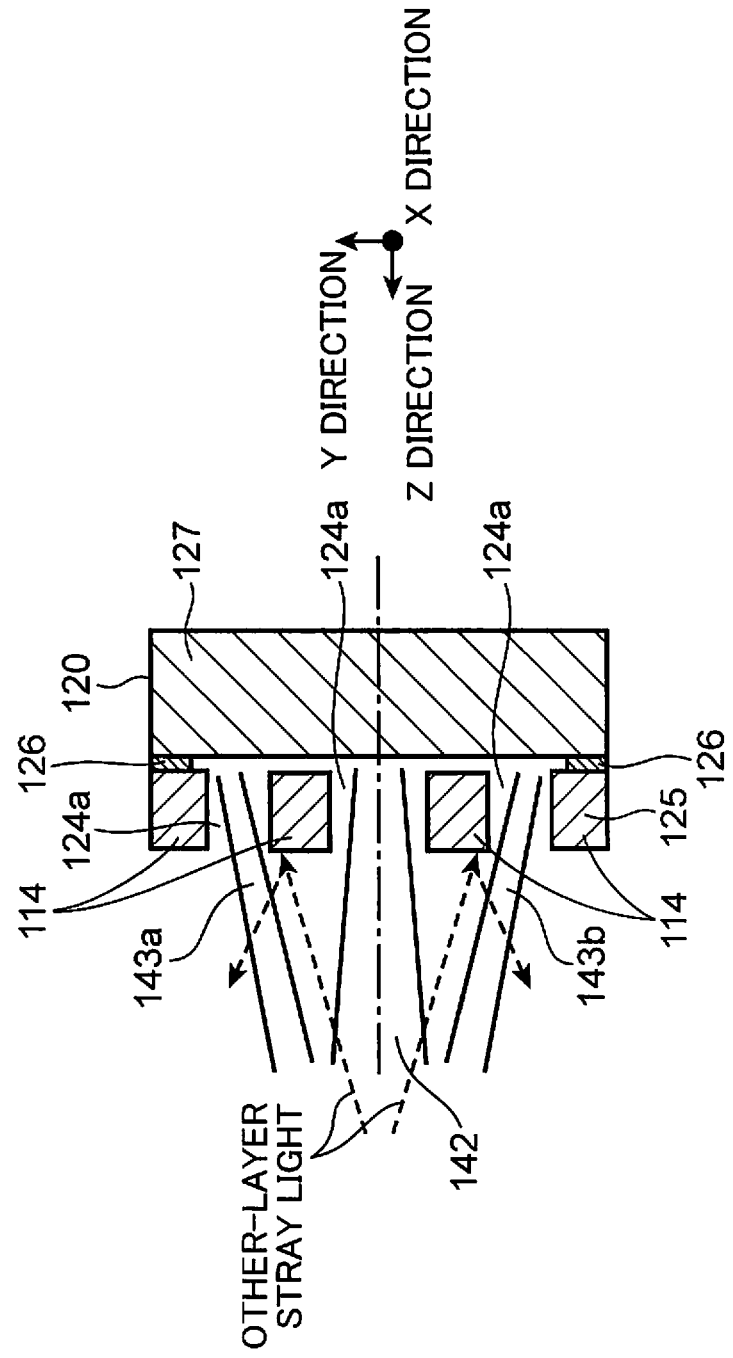

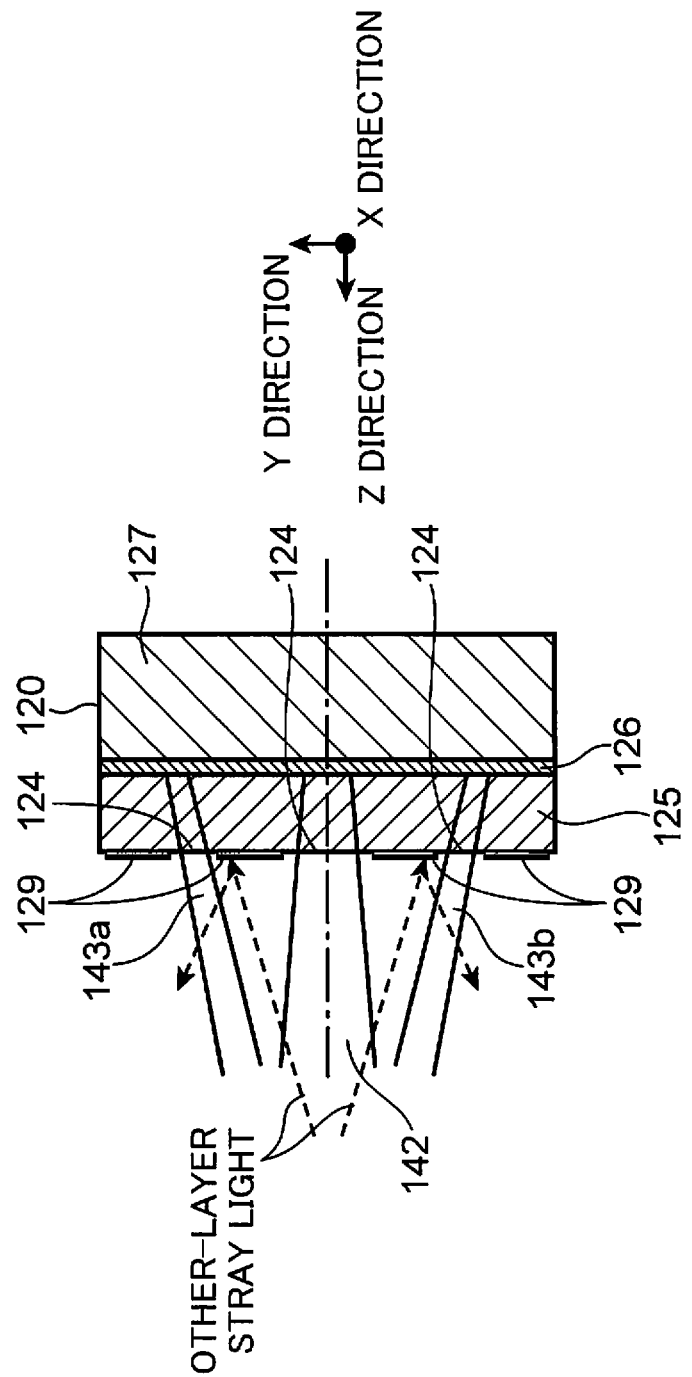

OPTICAL HEAD AND OPTICAL INFORMATION DEVICE

TECHNICAL FIELD

The present invention relates to an optical head for recording or reproducing information on an information recording medium such as an optical disc or an optical card, and an optical information device including the optical head.

BACKGROUND ART

A light detector of a conventional optical head includes a light-receiving unit, and a computation circuit for performing a prescribed computation on an electric signal obtained by photoelectrically transducing a light beam received at the light-receiving unit. The light-receiving unit is situated in the vicinity of generally the center of the light detector. On the light beam incident side of the light detector, an aperture is disposed (e.g., see Patent Literature 1).

FIG. 29 is a view showing a configuration of an optical system of a conventional optical head described in Patent Literature 1. FIG. 30 is a view showing the details of a detection optical system of the conventional optical head. FIG. 31 is a view showing a light-receiving surface of the light detector of the conventional optical head.

In FIG. 29, the optical head includes a semiconductor laser 401, a collimator lens 402, a beam splitter 403, an objective lens 404, detection means 406, a light detector 407, an aperture 408, and a diffraction grating 409.

An optical beam emitted from the semiconductor laser 101 is split into a plurality of different light beams by the diffraction grating 409. The light beams which have passed through the diffraction grating 409 are converted into parallel light beams at the collimator lens 402, and pass through the beam splitter 403. The light beams which have passed through the beam splitter 403 are converged by the objective lens 404, resulting in a so-called 3-beam converged light. The converged light is applied to the recording layer of the optical disc 405. A light reflected and diffracted at the recording layer of the optical disc 405 passes through the objective lens 404 again, and is reflected at the beam splitter 403. The objective lens 404 is driven in the optical axis direction (focusing direction) and in the radius direction (radial direction) of the optical disc 405 by an objective lens actuator not shown. The light beam reflected from the beam splitter 403 passes through the detection means 406, and is made incident on the light detector 407. At this step, the aperture 408 formed between the detection means 406 and the light detector 407 intercepts a stray light incident on the light-receiving unit of the light detector 407.

Further, in FIG. 30, the light detector 407 receives a light beam which has passed through the aperture 408. In the aperture 408, one opening 408a is formed. The shape of the opening 408a is generally a circular shape about the optical axis as indicated with a broken line in FIG. 31.

FIG. 32 is a view showing the arrangement of the light-receiving unit on the light-receiving surface of the light detector of the conventional optical head. The light beam which has passed through the detection means 406 is received by a quadrant light-receiving unit 410, so that a so-called focus error signal is generated.

FIG. 33 is a view showing the optical detection system of the conventional optical head. FIG. 34 is a view showing a light beam formed at the quadrant light-receiving unit of the light detector of the conventional optical head. As shown in FIG. 33, the detection means 406 has a cylindrical surface 406a on the light beam incident surface side thereof, and a concave lens surface 406b on the emitting surface side thereof. The detection means 406 causes an astigmatic difference of the difference in focal position by an angle of 90 degrees in a plane orthogonal to the optical axis. Further, the direction of the cylindrical surface 406a is disposed tilted at an angle of generally 45 degrees with respect to the quadrant light-receiving unit 410 of the light detector 407.

The face deflection or the like of the optical disc 405 changes the relative distance between the recording layer of the optical disc 405 and the objective lens 404. As a result, as shown in FIG. 34, the light beam 412a at the focal position becomes in a circular shape, and a light beam 412b at the anterior focal line and a light beam 412c at the posterior focal line are in ellipse shapes orthogonal to each other.

In FIG. 32, by computing the difference between the sum signals of the diagonal light-receiving regions of the quadrant light-receiving unit 410, a so-called focus error signal is detected; and by computing all the light-receiving region sum signals of the quadrant light-receiving unit 410, an RF signal is detected.

Further, the sub-beam light-receiving unit 411 of the light detector 407 receives a sub-beam in a so-called 3-beam method converged on the track of the recording layer of the optical disc 405, and reflected from the recording layer. With a so-called 3-beam method using a so-called push-pull signal computed based on the light quantity of the main beam 412 received at the quadrant light-receiving unit 410, and signals computed based on the light quantities of the sub-beams 413 received at the sub-beam light-receiving units 411, a tracking error signal is generated. Accordingly, there is performed tracking servo causing the objective lens 404 to follow the track of the recording layer of the optical disc 405.

The light detector 407 is previously fixed on a holder (not shown), and further, the optical axis adjustment of the light detector 407 is performed so that the light beam is incident on generally the center of the quadrant light-receiving unit 410. Then, the position of the light detector 407 is determined, and further, the holder and the light detector 407 are fixed on an optical base (not shown). The aperture 408 desirably has the smallest possible dimensions so as to prevent an unnecessary surface reflected light reflected from the surface of the optical base from being incident on the quadrant light-receiving unit 410 or the sub-beam light-receiving units 411. Herein, the hole diameter of the aperture 408 results in a value in view of the relative misalignment between the passing light beam diameter and the light detector 407, the dimensional tolerance of the aperture 408, and the like.

Currently, there has been an expectation for the development of an optical head adaptable to a high recording density multilayer optical disc which is compact in size, and has two or more recording layers. In order to implement the optical head adaptable to the compact and multilayer optical disc, the following configuration is necessary: stray lights reflected from other layers of the optical disc are prevented from being incident on the sub-beam light-receiving units 411 by increasing the so-called lateral magnification of a detection optical system which is the ratio between the focal length of the objective lens and the focal length of the collimator lens of the optical head. In addition, the detection optical system of the going path is required to be downsized. Incidence of stray lights reflected from other layers on the sub-beam light-receiving unit 411 causes an offset in a tracking error signal. Further, interference between lights reflected from the objective own layer and lights reflected from other layers results in fluctuations in DC level of the tracking error signal. This largely deteriorates the performance of tracking servo, so that the recording performance and the reproduction performance are reduced.

In order to implement the configuration of the optical head in which stray lights from other layers of the optical disc are not incident on the sub-beam light-receiving units 411, it becomes essential to increase the lateral magnification of the detection optical system of the optical head, and to increase the distance between the main beam and the sub-beam. However, at this step, the size of the aperture 408 is also increased, so that stray lights become more likely to be incident on the light detector 407. Accordingly, offsets are caused in the focus error signal and the tracking error signal, resulting in large deterioration of the quality of a servo signal and the quality of a reproduction signal. As a result, the recording performance and the reproduction performance are deteriorated. Particularly, the sub-beam has a light quantity which is about 1/10 of that of the main beam. Accordingly, a slight change in light quantity due to interference results in a large fluctuation of the tracking error signal.

Further, an increase in diameter of the opening 408a of the aperture 408 also results in a large reduction of the strength of the holder holding the aperture 408. In order to keep the strength of the holder, it is necessary to increase the dimensions of the holder. Accordingly, the dimensions of the optical head are also increased. As a result, it becomes impossible to implement both of the downsizing of the optical head and the improvement of the reproduction performance. In order to implement both of the downsizing of the optical head and the improvement of the reproduction performance, the following configuration is necessary: stray lights reflected from other layers of the optical disc are prevented from being incident on the sub-beam light-receiving units 411 by increasing the lateral magnification of the detection optical system. In addition, the dimension in the height direction of the optical head is required to be reduced by downsizing the detection optical system of the returning path of the optical disc, and downsizing the optical element and the light-receiving element.

In order to downsize the detection optical system of the returning path, it is necessary to reduce the focal lengths of the objective lens, the collimator lens, and the cylindrical lens, and to downsize various components of the optical head. With the downsizing of the light detector, and the downsizing of the holder holding the aperture 408, the downsizing due to the improvement of the precision of the aperture diameter also becomes essential.

FIG. 35 is a view for illustrating the relationship between the magnification of the detection optical system and the distance between the main beam and the sub-beam on the light detector, and the relationship between the magnification of the detection optical system and the distance between two sub-beams on the light detector. Table 1 is a table for showing the relationship between the magnification of the detection optical system and the distance between the main beam and the sub-beam on the light detector, and the relationship between the magnification of the detection optical system and the distance between two sub-beams on the light detector.

TABLE 1

| | Magnification of detection optical system (lateral magnification β) | | |
|---|---|---|---|
| | 6 | 14 | 16 |
| Distance X between main beam and sub-beam (μm) | 120 | 280 | 320 |
| Distance Y between sub-beams (μm) | 240 | 560 | 640 |

The lateral magnification of the detection optical system commonly used for a conventional optical head is generally 6 times. When the distance between the main beam and the sub-beam on the optical disc is assumed to be 20 μm, the distance X between the main beam 412 and sub-beam 413 on the light detector 407 becomes 120 μm. On the other hand, when the lateral magnification of the detection optical system is set at 14 times to 16 times in order to reproduce the multi-layer optical disc, the distance X between the main beam 412 and the sub-beam 413 on the light detector 407 is increased to 280 μm to 320 μm, resulting in an increase in dimensions of the light detector 407. Further, in order to make a light beam incident so that the sub-beam 413 is not vignetted at the sub-beam light-receiving unit 411 of the light detector 407, it is necessary to increase the diameter of the opening of the aperture. In order to increase the diameter of the opening of the aperture, it is necessary to ensure the strength of the holder for holding the aperture. This has posed a problem that the dimensions of the holder are increased, resulting in an increase in thickness of the optical head in the Y direction of FIG. 30.

Further, in order to minimize the dimension in the Y direction of the light detector 407, when the quadrant light-receiving unit 410 and the sub-beam light-receiving unit 411 are largely spaced apart from each other, a computation circuit is disposed between the quadrant light-receiving unit 410 and the sub-beam light-receiving unit 411. In this case, it results that other-layer stray lights or stray lights reflected from the surface of the optical base and the like are also incident on the computation circuit. When a light is applied to an amplifier unit of the computation circuit of the light detector 407, a weak signal is generated at the amplifier unit. The generated weak signal leaks into an output signal, resulting in an offset of a focus error signal or a tracking error signal. As a result, the qualities of the servo signal and the reproduction signal are largely deteriorated. This results that the recording performance and the reproduction performance are deteriorated.

The focus error signal is calculated based on the following equation (1), and the tracking error signal is calculated based on the following equation (2):

$$\text{Focus error signal} = (A2 + A4) - (A1 + A3) \tag{1}$$

$$\text{Tracking error signal} = (A3 + A4) - (A1 + A2) - k(B2 - B1) \tag{2}$$

Incidentally, in the equations (1) and (2), A1 to A4 each represent the output from each light-receiving region of the quadrant light-receiving unit 410. B1 and B2 each represent the output from each light-receiving region of the sub-beam light-receiving unit 411 divided into two parts, and k represents the gain.

In the tracking error signal, the light quantity of the sub-beam 413 is smaller than the light quantity of the main beam 412. The light quantity of the sub-beam 413 is about 1/10 of the light quantity of the main beam 412. For this reason, the difference value between outputs from respective light-receiving regions of the sub-beam light-receiving unit 411 is multiplied by a gain k, thereby to perform a correction. Generally, the gain k is set at a value of about 1 to 5. At this step, the signal resulting from the sub-beam fluctuates due to interference, resulting in a large fluctuation of the tracking error signal. For this reason, it becomes essential to reduce the quantity of other-layer stray lights incident on the sub-beam light-receiving unit 411.

CITATION LIST

Patent Literature

Patent Literature 1: Japanese Patent Application Laid-open No. H5-290404

SUMMARY OF INVENTION

The present invention was made in order to solve the problems described above. It is an object thereof to provide an optical head and an optical information device by which the optical head can be downsized, and which can improve the qualities of a focus error signal, a tracking error signal, and a reproduction signal.

An optical head in accordance one aspect of the present invention is an optical head for reproducing information from an information recording medium having two or more recording layers. The optical head includes: a light source for emitting a light beam; an objective lens for converging the light beam emitted from the light source to the information recording medium; an astigmatism causing unit for causing an astigmatism in a reflected light beam reflected at the information recording medium; a light beam dividing unit for dividing an incident light beam; and a light detector for detecting the reflected light beam including the astigmatism caused therein by the astigmatism causing unit. The light detector includes: a light-receiving unit for receiving the reflected light beam, and a package for covering the light-receiving unit. The package has a plurality of light guides formed on a light-receiving surface on a light beam incident side of the light-receiving unit, and for guiding the reflected light beam to the light-receiving unit, and a light shield for shielding a region except for a plurality of the light guides from light.

With this configuration, the light source emits a light beam. The objective lens converges the light beam emitted from the light source to the information recording medium. The astigmatism causing unit causes an astigmatism in a reflected light beam reflected at the information recording medium. The light beam dividing unit divides any one of the light beam emitted from the light source, and the reflected light beam reflected at the information recording medium. The light detector detects the reflected light beam having an astigmatism caused therein by the astigmatism causing unit. The light detector includes the light-receiving unit for receiving a reflected light beam, and the package for covering the light-receiving unit. The package has a plurality of light guides formed on a light-receiving surface on a light beam incident side of the light-receiving unit, and for guiding the reflected light beam to the light-receiving unit, and a light shield for shielding a region except for a plurality of the light guides from light.

In accordance with the present invention, the light guides are formed on the light-receiving surface on the light beam incident side of the light-receiving unit. For this reason, it is possible to downsize the optical head as compared with the configuration including an aperture other than the light detector. Further, a plurality of the light guides are formed on the light-receiving surface on the light beam incident side of the light-receiving unit. This can prevent a stray light from being incident on the light-receiving unit. As a result, it is possible to improve the qualities of a focus error signal, a tracking error signal, and a reproduction signal.

The object, features, and advantages of the present invention will become more apparent from the following detailed description and the accompanying drawings.

BRIEF DESCRIPTION OF DRAWINGS

FIG. 11 is a cross-sectional view showing a configuration example of the light guide of the light detector in Embodiment 1 of the present invention light detector.

FIG. 12 is a cross-sectional view showing a configuration example of the light guide of a light detector in a first modified example of Embodiment 1 of the present invention.

DESCRIPTION OF EMBODIMENTS

Below, embodiments of the present invention will be described by reference to the accompanying drawings. Incidentally, the following embodiments are one examples each embodying the present invention, and are not construed as limiting the technical scope of the present invention.

Embodiment 1

Figure 1:
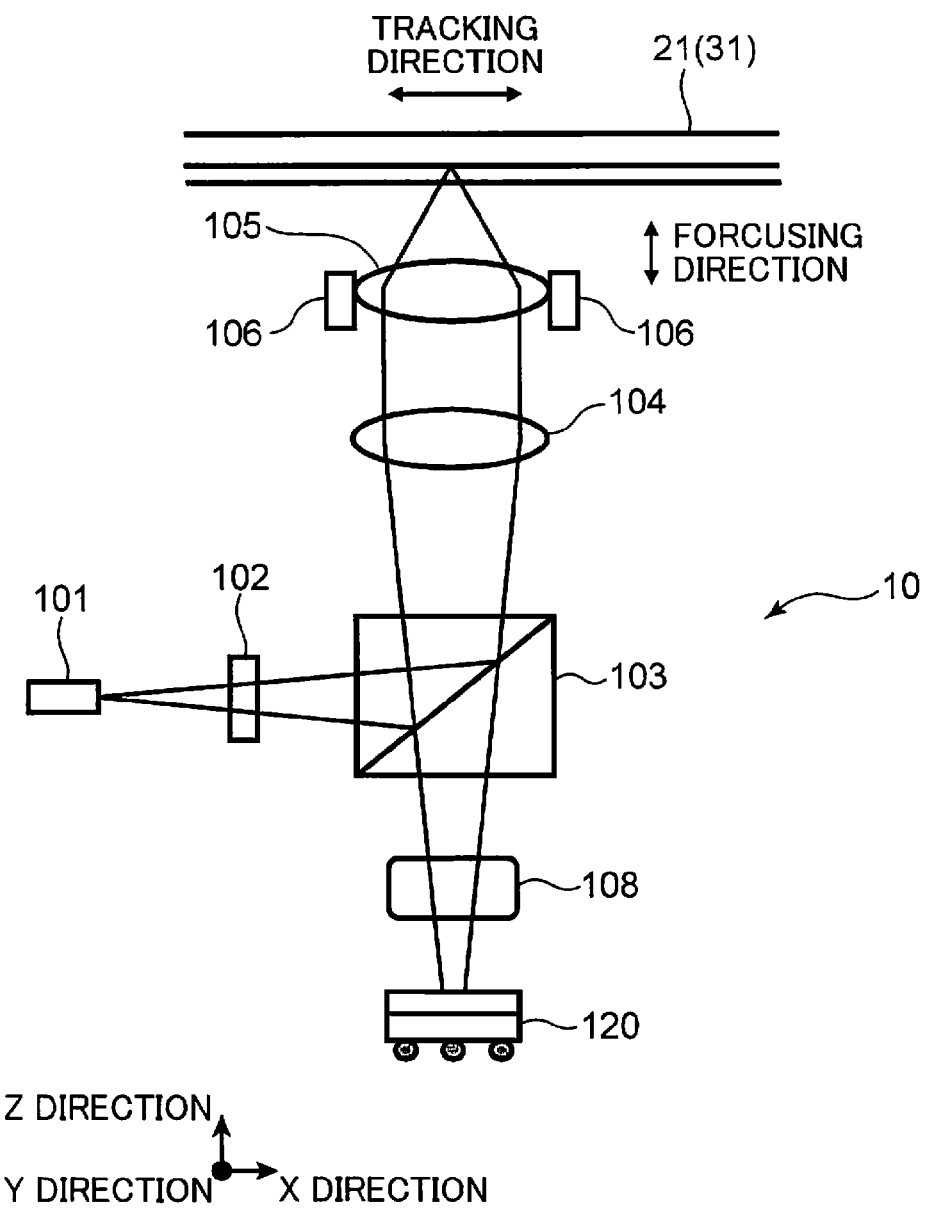
FIG. 1 is a view showing a configuration of the optical system of an optical head in Embodiment 1 of the present invention.

FIG. 1 is a view showing a configuration of an optical system of an optical head in Embodiment 1 of the present invention.

In FIG. 1, the same constitutional elements as those in FIGS. 29 to 35 are described by using the same reference numerals and signs. In FIG. 1, an optical head 10 includes a semiconductor laser 101, a diffraction grating 102, a beam splitter 103, a collimator lens 104, an objective lens 105, an objective lens actuator 106, a cylindrical lens 108, and a light detector 120.

The semiconductor laser 101 emits a light beam. The light beam emitted from the semiconductor laser 101 as a light source is split into a plurality of different light beams by the diffraction grating 102. The diffraction grating 102 divides the light beam emitted from the semiconductor laser 101. The diffraction grating 102 divides the light beam emitted from the semiconductor laser 101. The diffraction grating 102 divides the incident light beam into a main beam and first and second sub-beams.

A light beam which has passed through the diffraction grating 102 is reflected at the beam splitter 103, then converted into parallel light beams at the collimator lens 104, and is incident on the objective lens 105. The objective lens 105 converges the light beam emitted from the semiconductor laser 101 onto the optical disc 21. The light beam incident on the objective lens 105 becomes a so-called 3-beam converged light, and is applied to the optical disc 21. The objective lens 105 is driven in the optical axis direction (focus direction) and in the tracking direction (radial direction) of the optical disc 21 by the objective lens actuator 106 (not shown in details).

The light beam reflected and diffracted at the recording layer of the optical disc 21 passes through the objective lens 105 and the collimator lens 104 again, and is incident on the beam splitter 103. The light beam which has passed through the beam splitter 103 is incident on the cylindrical lens 108. The cylindrical lens 108 causes an astigmatism in a reflected light beam reflected at the optical disc 21. The light beam which has passed through the cylindrical lens 108 is incident on the light detector 120. The light detector 120 detects the reflected light beam having an astigmatism caused therein by the cylindrical lens 108.

Figure 2A:
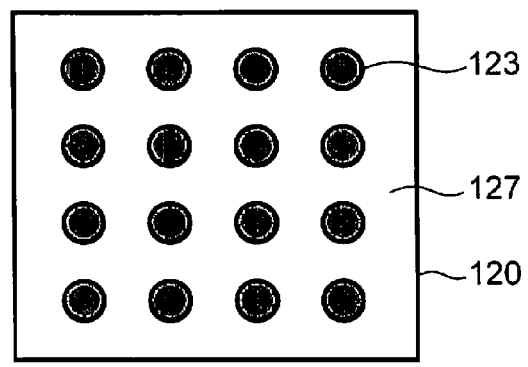
FIG. 2A is a view showing the bottom surface of the light detector in Embodiment 1 of the present invention.
Figure 2B:
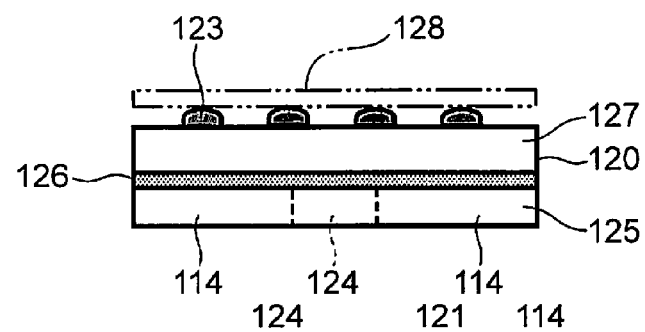
FIG. 2B is a view showing the side surface of the light detector in Embodiment 1 of the present invention.
Figure 2C:
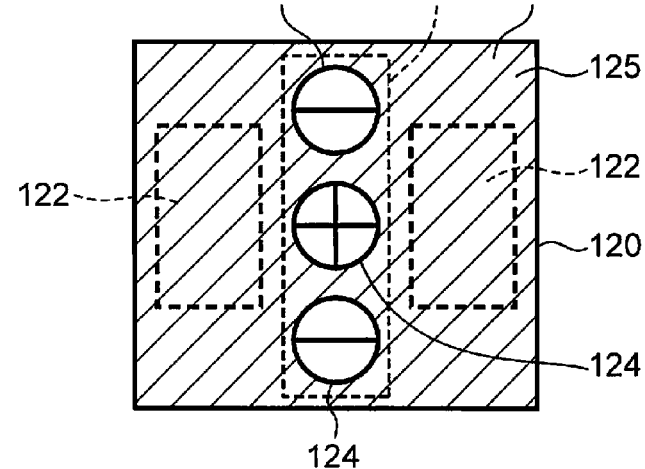
FIG. 2C is a view showing the front surface of the light detector in Embodiment 1 of the present invention.
Figure 2D:
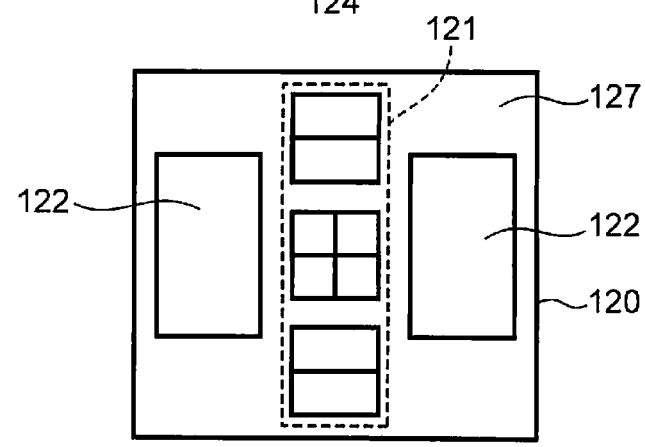
FIG. 2D is a view showing a configuration of the light detector of FIG. 2C from which the package and the adhesive have been removed.

FIGS. 2A to 2D are front views and a side view showing the configuration of the light detector 120. FIG. 2A is a view showing the bottom surface of the light detector in Embodiment 1 of the present invention. FIG. 2B is a view showing the side surface of the light detector in Embodiment 1 of the present invention. FIG. 2C is a view showing the front surface of the light detector in Embodiment 1 of the present invention. FIG. 2D is a view showing a configuration of the light detector of FIG. 2C from which the package 125 and the adhesive 126 have been removed.

The light detector 120 includes a light-receiving unit 121, a computation circuit 122, terminal parts 123, and the package 125. The light-receiving unit 121 receives a reflected light beam reflected from the optical disc 21. The computation circuit 122 performs a prescribed computation on an electrical signal obtained by photoelectrically transducing the reflected light beam received at the light-receiving unit 121. The package 125 covers the light-receiving unit 121 and the computation circuit 122.

On the substrate 127 made of a silicon wafer or the like, there are formed the light-receiving unit 121, the computation circuit 122, and the terminal parts 123. The package 125 formed of a resin such as silicone, glass, or a metal is bonded onto the substrate 127 by the adhesive 126. On the surface on the light incident side of the substrate 127, there are formed the light-receiving unit 121 and the computation circuit 122. On the surface opposite to the light incident side surface, there are formed the terminal parts 123.

The package 125 has a plurality of light guides 124 formed on the light-receiving surface on the light beam incident side of the light-receiving unit 121, and for guiding a reflected light beam to the light-receiving unit 121, and a light shield 114 for shielding a region except for a plurality of the light guides 124 from light.

Each terminal part 123 is mounted on a FPC (flexible printed substrate) 128 by soldering, and transmits a signal detected at the light-receiving unit 121. Incidentally, the FPC 128 may be a circuit substrate. The light guides 124 are formed as openings or transmission parts in the package 125, and are aligned with respective light-receiving regions (not shown) of the light-receiving unit 121 with precision, respectively. The package 125 is disposed on the incident light beam side. The portion indicated with oblique lines of FIG. 2C is the light shield 114 for shielding against an incident light beam, and blocks stray lights from other layers different from the objective recording layer with precision. At this step, the transmittance of the light shield 114 is desirably 10% or less.

The light-receiving unit 121 includes a plurality of light-receiving regions. In the package 125, the light guides 124 are each individually formed for light beams incident on respective light-receiving regions of the light-receiving unit 121, respectively. In FIG. 2C, three light guides 124 corresponding to a main beam, a first sub-beam, and a second sub-beam are formed in the package 125. Alternatively, the light guides 124 may be disposed on respective light-receiving regions of the light-receiving unit 121.

In the computation circuit 122 formed of a multilayer circuit, via holes are disposed. Through the via holes, the computation circuit 122 and the terminal parts 123 disposed at the bottom surface of the light detector 120 are connected. Incidentally, the terminal part 123 may be connected with the computation circuit 122 by a wire from the side surface of the light detector 120. The adhesive 126 may be coated on the region except for the light-receiving unit 121 on the substrate 127, may be coated on only the four corners of the substrate 127, or may be coated entirely on the top surface of the substrate 127.

At this step, the material for the adhesive 126 is selected according to the balance between the transmittance due to the combination of the package 125, the light guides 124, and the adhesive 126, and the quality deterioration of the adhesive 126 due to a light with a wavelength of 405 nm.

Figure 3:
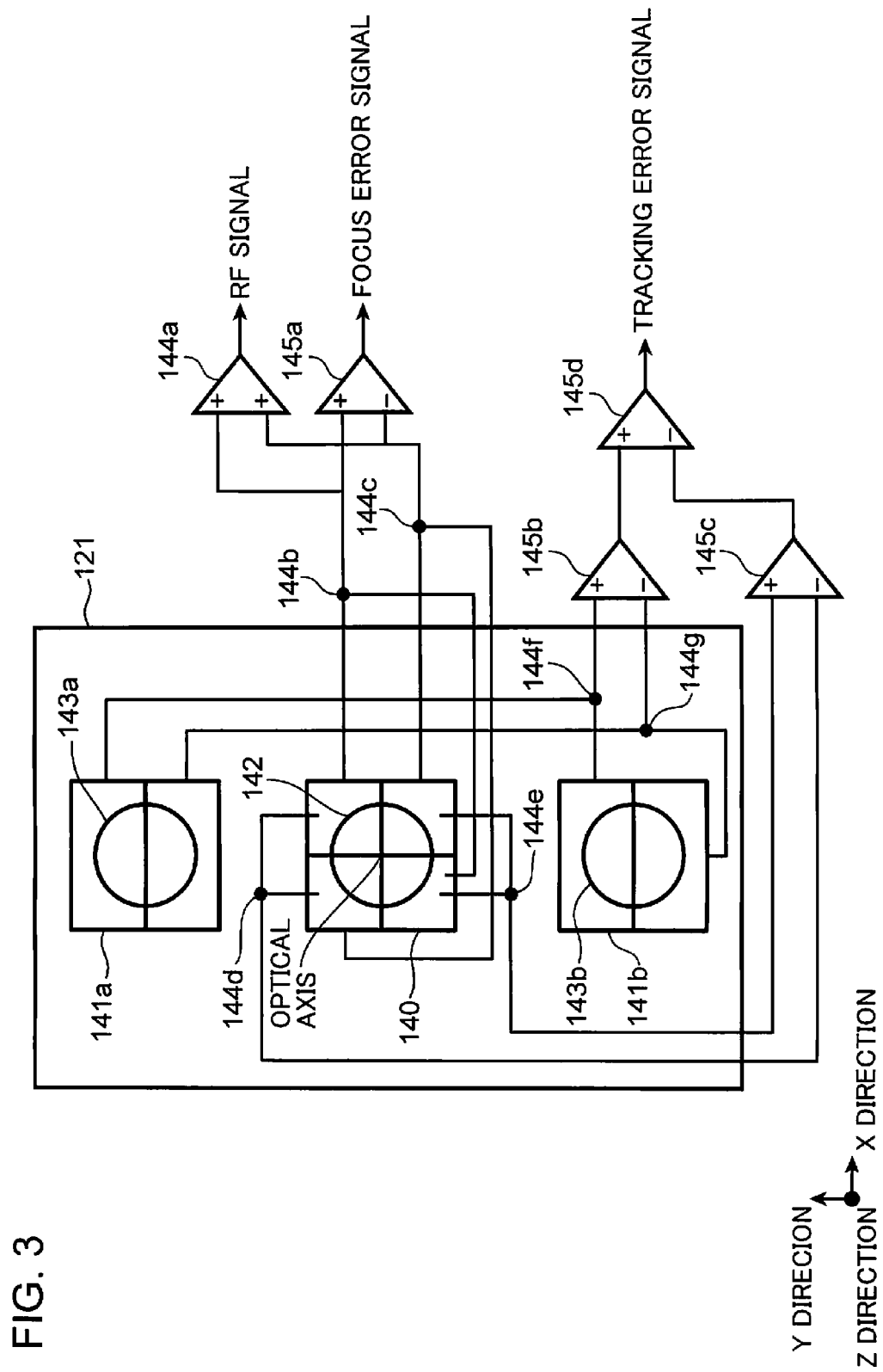
FIG. 3 is a view showing a configuration of the light-receiving unit of the light detector, and a configuration of a computation circuit in Embodiment 1 of the present invention.

FIG. 3 is a view showing a configuration of the light-receiving unit 121 of the light detector 120, and the configuration of the computation circuit 122 in Embodiment 1 of the present invention. The light-receiving unit 121 includes a quadrant light-receiving region 140, a first sub-beam light-receiving region 141a, and a second sub-beam light-receiving region 141b. The computation circuit 122 includes first to seventh summing amplifiers 144a to 144g, and first to fourth differential amplifiers 145a to 145d.

The quadrant light-receiving region 140 receives the main beam 142 of the light beams which have passed through the cylindrical lens 108. The first differential amplifier 145a computes the difference between the diagonal sum signals of the quadrant light-receiving region 140, thereby to detect a focus error signal. The first summing amplifier 144a computes the sum of all the signals of the quadrant light-receiving region 140, thereby to detect an RF signal.

Namely, the second summing amplifier 144b and the third summing amplifier 144c add signals respectively outputted from diagonally situated regions of the quadrant light-receiving region 140. The first differential amplifier 145a calculates the difference between a sum signal outputted from the second summing amplifier 144b and a sum signal outputted from the third summing amplifier 144c. Whereas, the first summing amplifier 144a adds a sum signal outputted from the second summing amplifier 144b, and a sum signal outputted from the third summing amplifier 144c.

On the other hand, the first sub-beam light-receiving region 141a and the first sub-beam light-receiving region 141b of the light detector 120 receive a first sub-beam 143a and a second sub-beam 143b in a so-called 3-beam method, converged to and reflected at the recording layer of the optical disc 21, respectively. Out of the light beams which have passed through the cylindrical lens 108, the first sub-beam 143a and the second sub-beam 143b are received by the first sub-beam light-receiving region 141a and the first sub-beam light-receiving region 141b, respectively. The first sub-beam light-receiving region 141a and the first sub-beam light-receiving region 141b are each divided into two regions along the Y direction (in the direction perpendicular to the tracking direction).

A push-pull signal computed based on the main beam 142 received at the quadrant light-receiving region 140, signals corresponding to the light quantities received at the first sub-beam light-receiving region 141a and the first sub-beam light-receiving region 141b are computed at the sixth and seventh summing amplifiers 144f and 144g, and the second to fourth differential amplifiers 145b to 145d. This generates a tracking error signal in the 3-beam method, a so-called DPP (differential push pull) method. Accordingly, there is performed tracking servo for allowing the objective lens 105 to follow the track of the recording layer of the optical disc 21.

Namely, the fourth summing amplifier 144d and the fifth summing amplifier 144e each add signals outputted from the regions adjacent in the X direction (tracking direction of the quadrant light-receiving region 140, respectively. The third differential amplifier 145c calculates the difference between the sum signal outputted from the fourth summing amplifier 144d and the sum signal outputted from the fifth summing amplifier 144e. Further, the sixth summing amplifier 144f adds a signal outputted from the region at the upper part of the first sub-beam light-receiving region 141a, and a signal outputted from the region at the upper part of the second sub-beam light-receiving region 141b. The seventh summing amplifier 144g adds a signal outputted from the region at the lower part of the first sub-beam light-receiving region 141a, and a signal outputted from the region at the lower part of the second sub-beam light-receiving region 141b. The second differential amplifier 145b calculates the difference between the sum signal outputted from the sixth summing amplifier 144f, and the sum signal outputted from the seventh summing amplifier 144g. Further, the fourth differential amplifier 145d calculates the difference between the differential signal outputted from the second differential amplifier 145b, and the differential signal outputted from the third differential amplifier 145c.

Incidentally, in the present embodiment, the objective lens 105 corresponds to one example of the objective lens. The cylindrical lens 108 corresponds to one example of the astigmatism causing unit. The diffraction grating 102 corresponds to one example of the light beam dividing unit. The light detector 120 corresponds to one example of the light detector. The light-receiving unit 121 corresponds to one example of the light-receiving unit. The package 125 corresponds to one example of the package. A plurality of the light guides 124 correspond to one example of a plurality of light guides. The light shield 114 corresponds to one example of the light shield. The quadrant light-receiving region 140 corresponds to one example of the main beam light-receiving unit. The first sub-beam light-receiving region 141a corresponds to one example of the first sub-beam light-receiving unit. The second sub-beam light-receiving region 141b corresponds to one example of the second sub-beam light-receiving unit.

Figure 4:
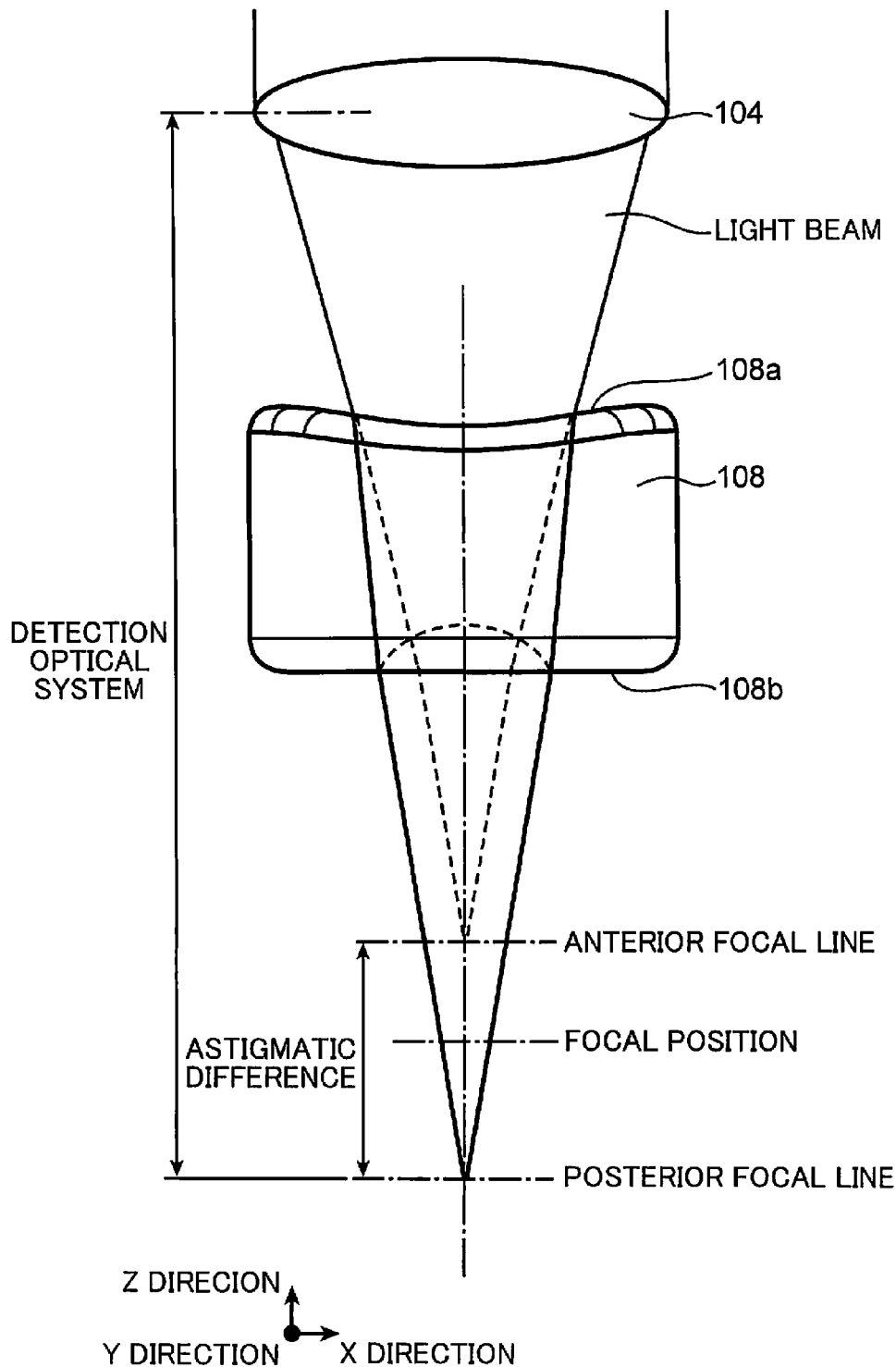
FIG. 4 is a view showing a configuration of a detection optical system including a cylindrical lens in Embodiment 1 of the present invention.

FIG. 4 is a view showing a configuration of a detection optical system including a cylindrical lens in Embodiment 1 of the present invention. As shown in FIG. 4, the cylindrical lens 108 has a cylindrical surface 108a in a cylindrical shape on the light beam incident surface side, and has a concave lens surface 108b having a lens power on the emitting surface side. The cylindrical surface 108a causes an astigmatic difference of the difference in focal position by an angle of 90 degrees in a plane orthogonal to the optical axis. Further, the direction of the cylindrical surface 108a is disposed tilted at an angle of generally 45 degrees with respect to the quadrant light-receiving unit 140 of the light detector 120.

Figure 5:
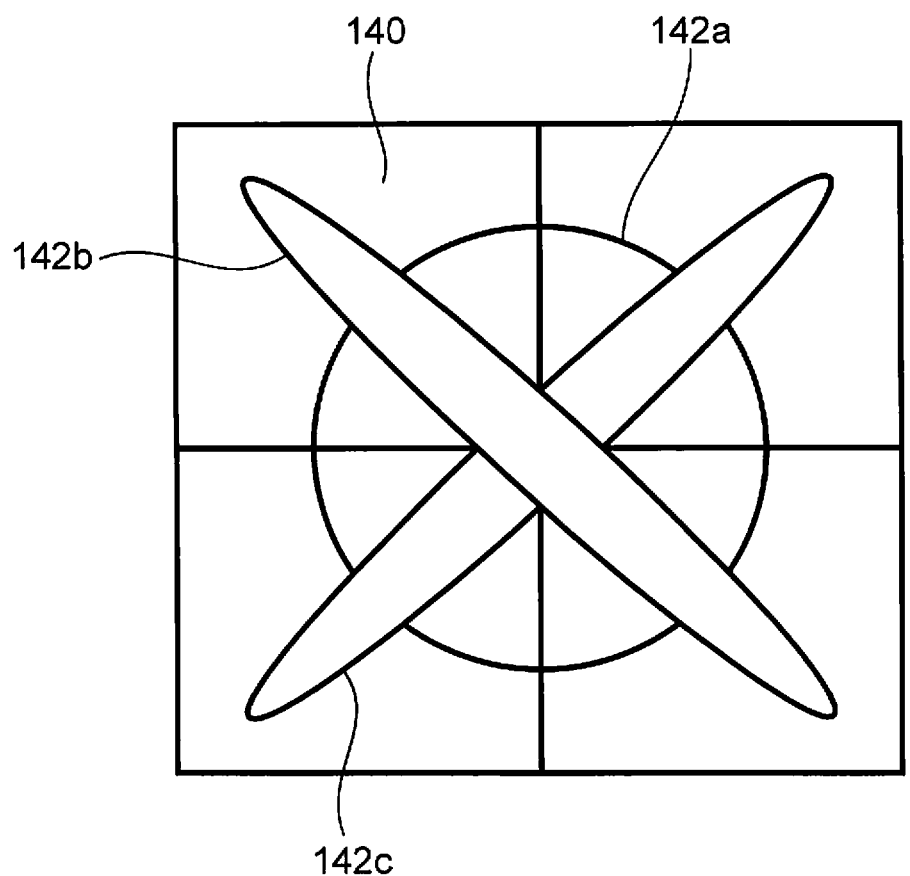
FIG. 5 is a view showing the shapes of the main beams on a quadrant light-receiving region at the anterior focal line, the posterior focal line, and the focal position.

FIG. 5 is a view showing the shapes of the main beams on the quadrant light-receiving region 140 at the anterior focal line, the posterior focal line, and the focal position. The main beam 142a at the focal position is in a circular shape. The main beam 142b at the anterior focal line and the main beam 142c at the posterior focal line are in ellipse shapes orthogonal to each other.

The face deflection or the like of the optical disc 21 changes the relative distance between the recording layer of the optical disc 21 and the objective lens 105. This results in the formation of the light beams as shown in FIG. 5 at the anterior focal line and the posterior focal line. The light-receiving unit 121 is disposed at the focal position of FIG. 4. the lateral magnification (β) of the detection optical system is determined by the focal length of the objective lens 105, the focal length of the collimator lens 104, and the optical power of the concave lens surface 108b of the cylindrical lens 108.

Figure 6:
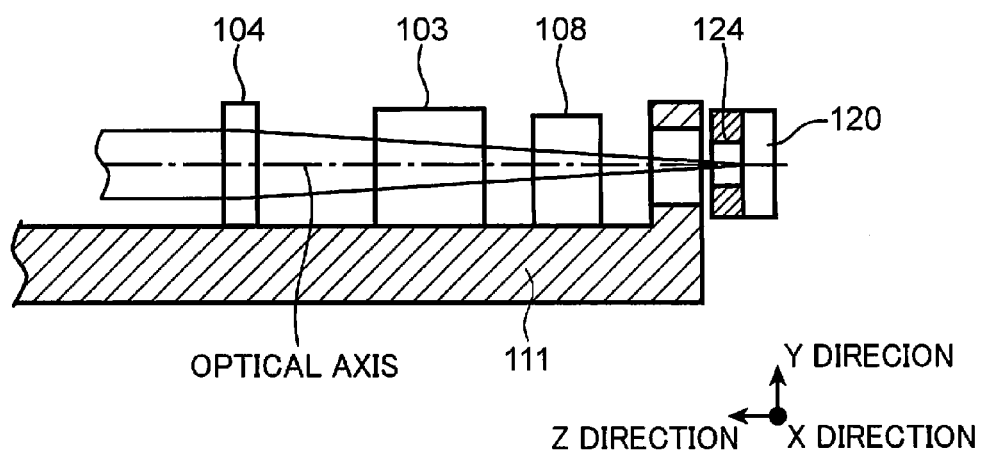
FIG. 6 is a cross-sectional view showing a partial configuration of from a collimator lens to the light detector of the optical head in Embodiment 1 of the present invention.

FIG. 6 is a cross-sectional view showing the partial configuration of from the collimator lens 104 to the light detector 120 of the optical head 10 in Embodiment 1 of the present invention. The optical base 111 holds the semiconductor laser 101 (not shown), the diffraction grating 102 (not shown), the beam splitter 103, the collimator lens 104, the objective lens actuator 106 for driving the objective lens 105 (not shown), and the cylindrical lens 108. On the other hand, the light detector 120 is fixed on the optical base 111 by an external jig (not shown). The light detector 120 is configured to be adjustable in the Z direction (optical axis direction) and within the X-Y plane (the plane orthogonal to the optical axis) on the optical base 111.

Then, a description will be given to the adjustment of the light detector 120 with respect to the optical base 111 and the optical axis. The position of the light detector 120 in the X-Y plane is adjusted so that the main beam 142 to be incident on the quadrant light-receiving region 140 of the light detector 120 is incident on generally the center of the quadrant light-receiving region 140. On the other hand, the position in the Z direction is adjusted so that the light-receiving unit 121 is disposed at the focal position of the astigmatic difference with the objective lens 105 focused on the recording layer of the optical disc 21. As a result, the main beam 142 incident on the quadrant light-receiving region 140 becomes in a circular shape, which eliminates the offset from the focus error signal. At this step, with the objective lens 105 focused on the recording layer of the optical disc 21, the output of the focus error signal is 0. Further, the rotation adjustment about the optical axis (θZ) is performed so that the first sub-beam 143a and the second sub-beam 143b are incident on generally the centers of the first sub-beam light-receiving region 141a and the second sub-beam light-receiving region 141b, respectively. By the positional adjustment in the X-Y plane, the balance adjustment of the focus error signal is performed. By the rotation adjustment about the optical axis (θZ), the detailed adjustment of the tracking error signal is performed. By the positional adjustment in the Z direction, the adjustment of the focus offset of the focus error signal is performed.

The optical design is achieved in a relation in which adjustment of the focus error signal allows the first sub-beam 143a and the second sub-beam 143b to be generally incident on the first sub-beam light-receiving region 141a and the second sub-beam light-receiving region 141b, respectively. Whereas, the rotation adjustment of the whole light detector 120 about the optical axis center is performed so as to maximize the amplitude of the tracking error signal. As a result, there is performed fine adjustment of the positional relationship between the first sub-beam 143a and the second sub-beam 143b with the first sub-beam light-receiving region 141a and the second sub-beam light-receiving region 141b. The RF signal is detected by adding all the light beams received at the quadrant light-receiving region 140.

As shown in FIG. 6, the light detector 120 is held with an external jig (not shown). Further, the optical axis adjustment of the light detector 120 is performed so that the main beam 142 is incident on generally the center of the quadrant light-receiving region 140. The light detector 120 is fixed in the aligned state on the optical base 111. The light guide 124 desirably has the possible smallest dimensions so as to prevent reflected lights from other layers from becoming stray lights and divergent light beams and from being incident on the quadrant light-receiving region 140, the first sub-beam light-receiving region 141a, and the second sub-beam light-receiving region 141b, and further so as to prevent unnecessary surface reflected lights reflected at the surface of the optical base 111 from being incident on the quadrant light-receiving region 140, the first sub-beam light-receiving region 141a, and the second sub-beam light-receiving region 141b. Herein, the diameter or the surface area of the light guide 124 is a value in view of the passing light beam diameter, the adjustment error upon optical axis adjustment of the light detector 120, the relative misalignment between the light guides 124 and the light-receiving unit 121, and the dimensional tolerance of the light guides 124, and the like.

Figure 7:
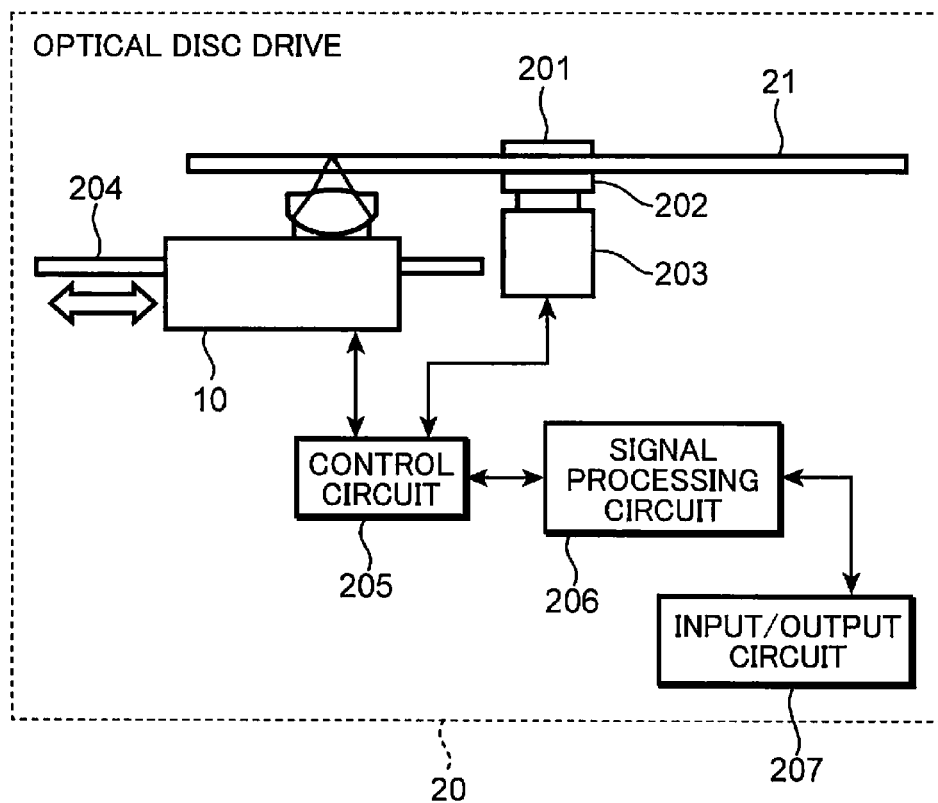
FIG. 7 is a view showing a configuration of the optical disc drive in Embodiment 1 of the present invention.

FIG. 7 is a view showing the configuration of the optical disc drive in Embodiment 1 of the present invention. In FIG. 7, the optical disc drive 20 includes an optical head 10, a motor 203, a traverse 204, a control circuit 205, a signal processing circuit 206, and an input/output circuit 207. The optical disc drive 20 corresponds to one example of the optical information device.

The optical disc 21 is fixed by being sandwiched by a clamper 201 and a turn table 202, and is rotated by a motor (rotation system) 203. The motor 203 is rotatably driven by the optical disc 21. The optical head 10 is mounted on the traverse (transfer system) 204. The traverse 204 moves the optical head 10 in the direction of radius of the optical disc 21. This allows the applied light to move from the inner circumference to the outer circumference of the optical disc 21.

The control circuit 205 controls the optical head 10 and the motor 203. The control circuit 205 performs focus control, tracking control, traverse control, the rotation control of the motor 203, and the like in response to signals received from the optical head 10. Further, the signal processing circuit 206 reproduces information from the reproduction signal (RF signal), and outputs it to the input/output circuit 207, and sends a recording signal incoming from the input/output circuit 207 to the optical head 10 through the control circuit 205.

Incidentally, in the present embodiment, the optical disc drive 20 corresponds to one example of the optical information device. The optical head 10 corresponds to one example of the optical head. The motor 203 corresponds to one example of the driving unit. The control circuit 205 corresponds to one example of the control unit.

Figure 8:
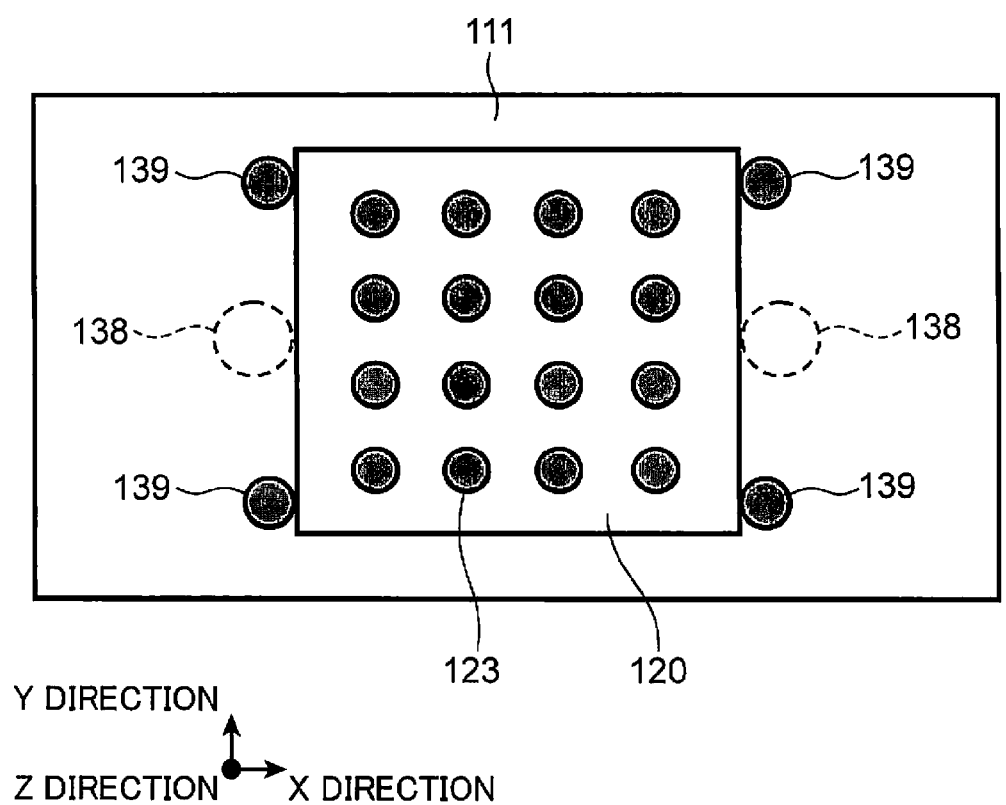
FIG. 8 is a view for illustrating a fixing method of the light detector and an optical base.

FIG. 8 is a view for illustrating a method for fixing the light detector 120 and the optical base 111. The positional adjustment in the X-Y plane, the positional adjustment in the Z direction, and the rotation adjustment about the optical axis of the light detector 120 are performed, and alignment is achieved by an external jig 138. Then, the optical base 111 and the light detector 120 are bonded and fixed by an adhesive 139.

Figure 9A:
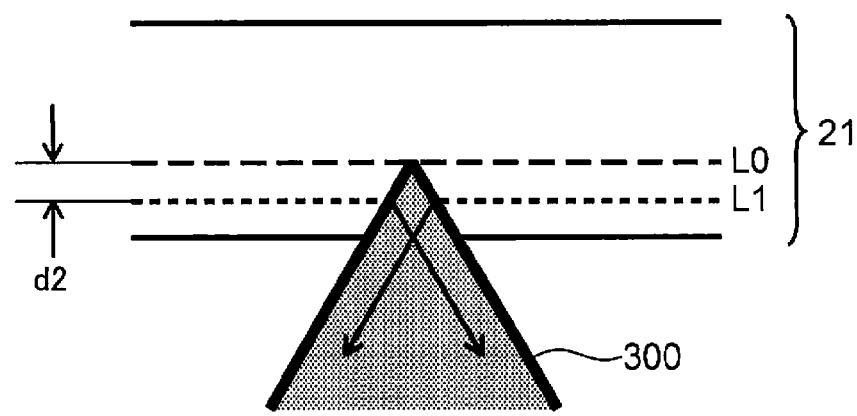
FIG. 9A is a view for illustrating the surface reflection from the other layer in a dual-layer optical disc.
Figure 9B:
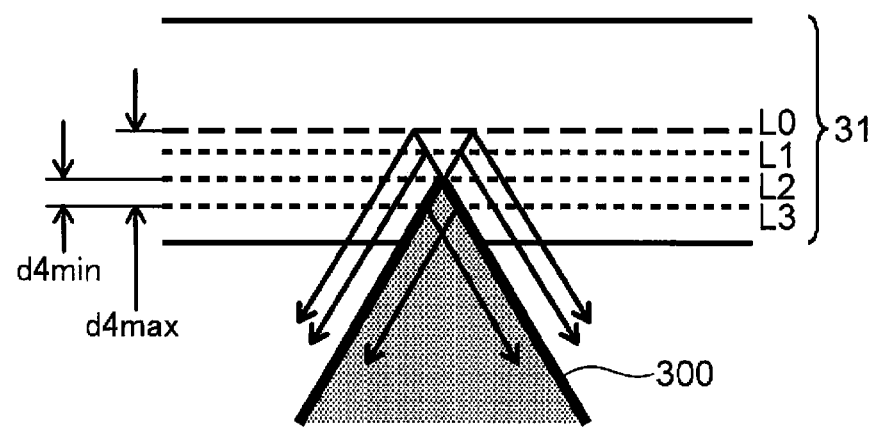
FIG. 9B is a view for illustrating the surface reflection from other layers in a multilayer optical disc.

FIG. 9A is a view for illustrating the surface reflection from the other layer of the dual-layer optical disc 21. FIG. 9B is a view for illustrating the surface reflection from other layers of the multilayer optical disc 31. When the reflected lights from the other layers are incident on the first sub-beam light-receiving region 141*a* and the second sub-beam light-receiving region 141*b*, an offset is caused in the tracking error signal, resulting in deterioration of tracking servo. FIG. 9A shows the configuration of the optical disc 21 having two recording layers, and shows the manner of occurrence of a stray light from another layer when a converged light 300 is converged on a given recording layer. In FIG. 9A, the focus is placed on a first recording layer L0, so that the lights reflected from the second recording layer L1 become other-layer stray lights.

Whereas, FIG. 9B shows the configuration of the optical disc 31 having four recording layers, and shows the manner of occurrence of stray lights from other layers when the converged light 300 is converged on a given recording layer. In FIG. 9B, the focus is placed on a third recording layer L2, so that lights reflected at a first recording layer L0, a second recording layer L1, and a fourth recording layer L3 become other-layer stray lights.

In the dual-layer optical disc 21 of FIG. 9A, the layer distance d2 between the first recording layer L0 and the second recording layer L1 is defined as 25±5 μm according to the standard, and is 20 μm at minimum, and is 30 μm at maximum. For this reason, the size of the other-layer stray light on the light detector 120 is restricted to a certain degree.

On the other hand, in the optical disc 31 having three or more recording layers of FIG. 9B, there is a high possibility that the layer distance d4 min which is the minimum distance is smaller than that of the dual-layer optical disc 21. Incidentally, in FIG. 9B, as an example, the layer distance between the third recording layer L2 and the fourth recording layer L3 is referred to as the layer distance d4 min. Whereas, the layer distance d4max which is the maximum distance is larger than that of the dual-layer optical disc 21. At this step, the size of the other-layer stray light at the light detector 120 is largely increased as compared with that of the dual-layer optical disc 21. Incidentally, in FIG. 9B, as an example, the layer distance between the first recording layer L0 and the fourth recording layer L3 is referred to as the layer distance d4max.

Therefore, in order to detect a stable tracking error signal for recording or reproducing information on the multilayer optical disc 31, it is necessary to prevent other-layer stray lights from being leaked into the first sub-beam light-receiving region 141*a* and the second sub-beam light-receiving region 141*b*. This requires the following: the magnification (the lateral magnification β) of the detection optical system is increased, thereby largely increasing the distances between the quadrant light-receiving region 140 for receiving the main beam 142, and the first sub-beam light-receiving region 141*a* and the second sub-beam light-receiving region 141*b* for receiving the first sub-beam 143*a* and the second sub-beam 143*b*, respectively.

Figure 10A:
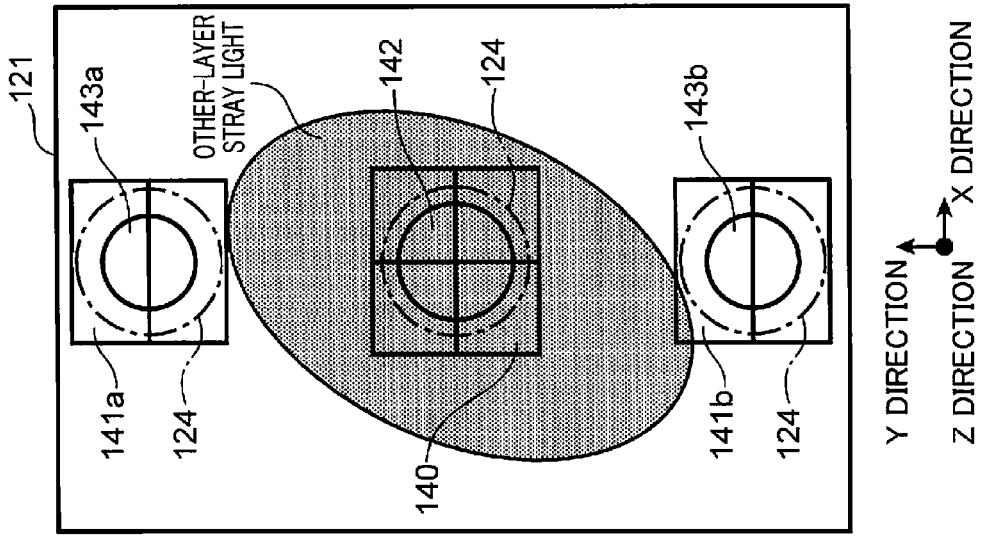
FIG. 10A is a view showing the relationship between the distance from the main beam to each sub-beam and an other layer stray light on the light detector of a conventional optical head.
Figure 10B:
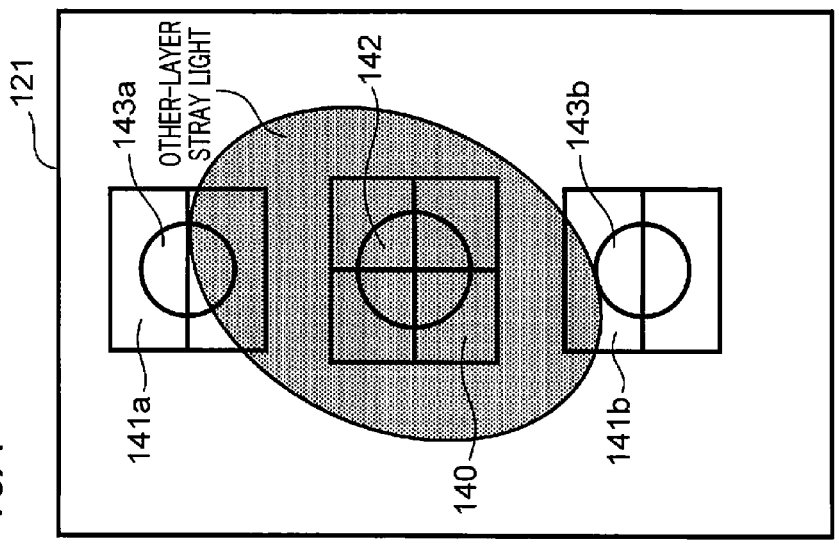
FIG. 10B is a view showing the relationship between the distance from the main beam to each sub-beam and an other layer stray light on the light detector of the optical head of Embodiment 1 of the present invention.

FIG. 10A is a view showing the relationship between the distance from the main beam to each sub-beam and an other layer stray light on the light detector of a conventional optical head. FIG. 10B is a view showing the relationship between the distance from the main beam to each sub-beam and an other layer stray light on the light detector of the optical head of Embodiment 1 of the present invention.

The distance between the main beam 142 and the first sub-beam 143*a* (or the second sub-beam 143*b*) on the light detector 120 is a value obtained by multiplying the distance between the main beam 142 and the first sub-beam 143*a* (or the second sub-beam 143*b*) converged on the track of the recording layer of the optical disc 21 by the lateral magnification of the detection optical system.

For example, when the distance between the main beam and the sub-beam on the track of the recording layer is assumed to be 20 μm, and the lateral magnification of the detection optical system is assumed to be about 6 times, the distance between the main beam 142 and the first sub-beam 143*a* (or the second sub-beam 143*b*) on the light detector 120 becomes about 120 μm. However, when the size of the other-layer stray light is assumed to be about 150 μm for recording or reproducing information on the multilayer optical disc, the lateral magnification of the detection optical system is required to be generally 10 times in order to detect a stable tracking error signal. The distance between the main beam 142 and the first sub-beam 143*a* (or the second sub-beam 143*b*) at this step is about 200 μm.

Herein, the distance between the main beam 142 and the first sub-beam 143*a* (or the second sub-beam 143*b*) on the track of the recording layer of the optical disc 21 was assumed to be generally 20 μm. This value affects the offset of the tracking error upon movement from the inner circumference to the outer circumference of the optical disc 21, and hence it is a value previously set for each device. Generally, 10 μm to 20 μm is selected.

On the other hand, in order to implement the downsizing of the optical head 10, the dimensions of the detection optical system are required to be reduced. This requires the downsizing of the detection optical system in view of the effect of the other-layer stray light. In view of the adverse effect of the other-layer stray light, the magnification of the detection optical system is required to be increased. By reducing the focal length of the objective lens 105, and reducing the focal length of the detection optical system, the detection optical system is downsized only with the objective lens 105 and the collimator lens 104 while keeping the lateral magnification. At this step, it becomes hard from the viewpoint of the space to form the holder for holding the light detector 120 or the aperture for blocking a stray light incident on the light-receiving unit 121 as a separate member.

As shown in FIG. 10B, in order to space the quadrant light-receiving region 140 from the first sub-beam light-receiving region 141*a* and the first sub-beam light-receiving region 141*b* so as to prevent an other-layer stray light from being incident on the first sub-beam light-receiving region 141*a* and the first sub-beam light-receiving region 141*b*, the lateral magnification of the detection optical system formed of the objective lens 105, the collimator lens 104 and the concave lens of the cylindrical lens 108 is desirably set within the range of from about 14 times to 16 times.

Further, in order to implement the downsizing of the optical head 10, it is necessary to reduce the dimensions of the detection optical system. This requires elimination of the holder for holding the light detector 120, and the aperture as a separate member for blocking a stray light incident on the light-receiving unit 121.

In FIG. 10B, the region of the light guide 124 through which a light beam passes is indicated with an alternate long and short dash line.

FIGS. 11 and 12 are each a cross-sectional view of generally the central parts of the quadrant light-receiving region 140, the first sub-beam light-receiving region 141a, and the first sub-beam light-receiving region 141b of the light detector 120 of FIG. 10B. The light detector 120 shown in FIGS. 11 and 12 are provided with three light guides 124, separately. FIG. 11 is a cross-sectional view showing the configuration example of the light guides of the light detector in Embodiment 1 of the present invention. FIG. 12 is a cross-sectional view showing the configuration example of the light guides of the light detector in a first modified example of Embodiment 1 of the present invention.

In FIG. 11, the package 125 is formed of a resin or a metal, and the transmittance of the package 125 is set at 10% or less. Further, in the package 125, the light guides 124 are formed by the openings 124a. Further, the portion of the package 125 except for a plurality of the openings 124a becomes the light shield 114.

On the other hand, in FIG. 12, the package 125 is formed of transparent glass or resin, and the transmittance of the package 125 is set at 90% or more. A light-shield film 129 formed of a metal film or an optical film is deposited on a region of the surface of the package 125 except for the regions corresponding to the light guides 124, resulting in the formation of the light guides 124 and the light shield 114. At this step, the transmittance of the light-shield film 129 is desirably set at 10% or less. It is shown that either light detector 120 of FIGS. 11 and 12 blocks an other-layer stray light incident in a divergent light beam with precision and with effectiveness.

Further, with either light detector 120 of FIGS. 11 and 12, it becomes possible to precisely block stray lights (mainly diagonally incoming light beam or divergent light beam) reflected at the surface of the optical base 111 or the optical element other than such other-layer stray lights.

Figure 13A:
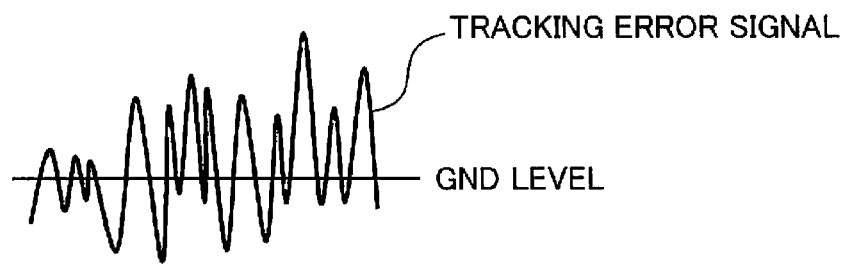
FIG. 13A is a view showing the waveform of a tracking error signal obtained with a conventional optical head.
Figure 13B:
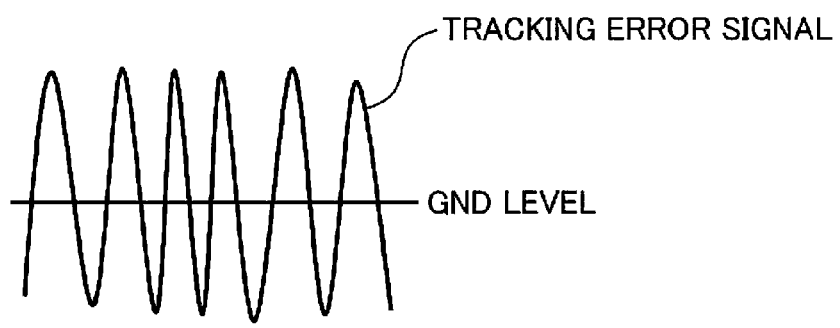
FIG. 13B is a view showing the waveform of a tracking error signal obtained with the optical head in Embodiment 1 of the present invention.

FIGS. 13A and 13B are each a view showing the level fluctuations of the tracking error signal due to the difference in the magnification of the detection optical system and the configuration of the light guides 124 between the related art and Embodiment 1. FIG. 13A is a view showing the waveform of a tracking error signal obtained with a conventional optical head, and FIG. 13B is a view showing the waveform of a tracking error signal obtained with the optical head in Embodiment 1 of the present invention.

When the first sub-beam 143a and the second sub-beam 143b interfere with an other-layer stray light, and the light guide 124 is not divided into three parts as shown in FIG. 10A, the fluctuations of the tracking error signal vary irregularly and largely under the influence of the interference as shown in FIG. 13A. At this step, the first sub-beam 143a and the second sub-beam 143b each generally have a light quantity as small as about 1/10 of that of the main beam 142, and hence the influence of interference increases. Therefore, it becomes essential to achieve the configuration in which the lateral magnification of the detection optical system is increased to reduce the interference of the first sub-beam 143a and the second sub-beam 143b with the other-layer stray light at the first sub-beam light-receiving region 141a and the second sub-beam light-receiving region 141b. In addition, it becomes essential to configure the light guides 124 in respective light-receiving regions, respectively, and to block the other-layer stray light.

With the optical head of Embodiment 1, as shown in FIG. 10B, the lateral magnification of the detection optical system is increased. In addition, the light guides 124 are configured precisely in respective light-receiving regions of the quadrant light-receiving region 140, the first sub-beam light-receiving region 141a, and the second sub-beam light-receiving region 141b. This results in a large reduction of the interference of the first sub-beam 143a and the second sub-beam 143b with the other-layer stray light. As a result, it becomes possible to obtain a stable tracking error signal showing less signal level fluctuations as shown in FIG. 13B.

Incidentally, in Embodiment 1, the light detector 120 is configured such that the substrate 127 formed of a silicon wafer, and including the light-receiving unit 121, the computation circuit 122, and the terminal parts 123 connected with the computation circuit 122 by internal wirings such as via holes or side wirings, is bonded with the package 125 having light guides 124 including openings formed therein, and made of a resin, glass, or a metal by the adhesive 126 with precision. However, the configurations shown in FIGS. 14A, 14B, 15A, and 15B are also acceptable.

Figure 14A:
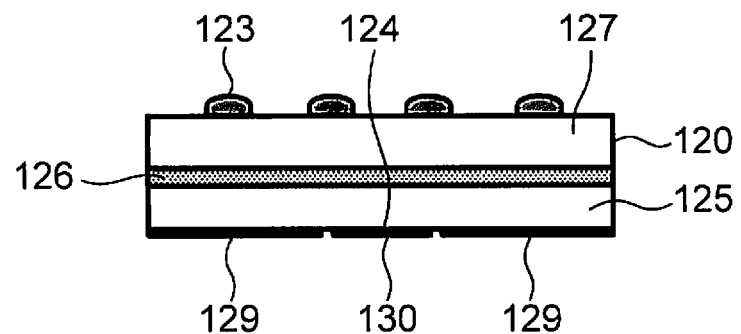
FIG. 14A is a side view showing a configuration of a light detector in a second modified example of Embodiment 1 of the present invention.
Figure 14B:
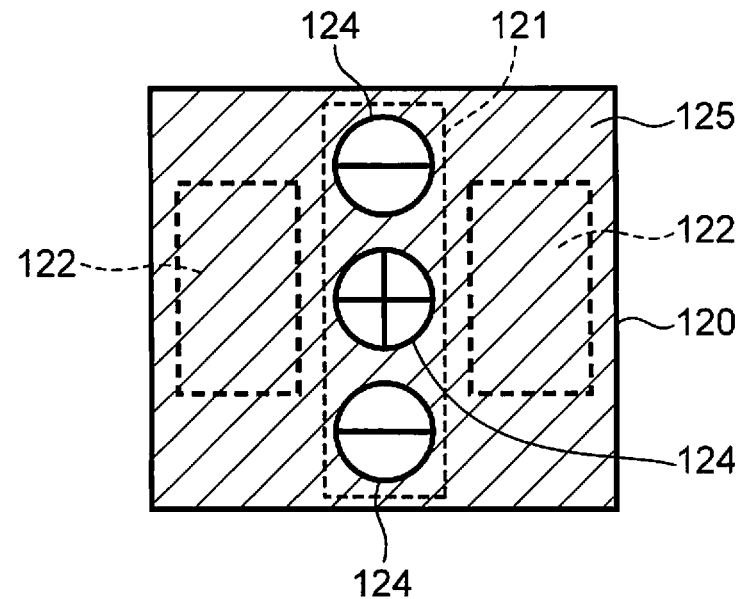
FIG. 14B is a view of the light detector shown in FIG. 14A as seen from the top thereof.
Figure 15A:
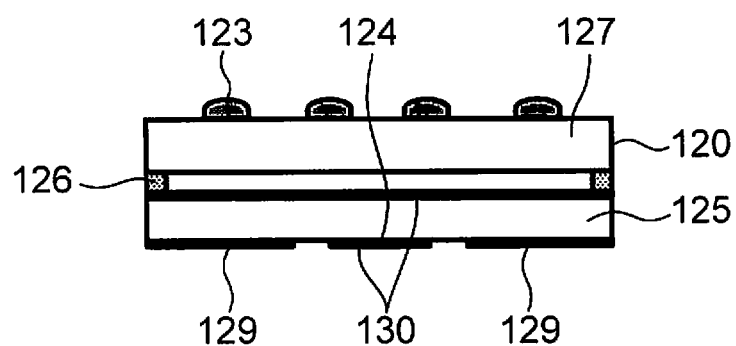
FIG. 15A is a side view showing a configuration of a light detector in a third modified example of Embodiment 1 of the present invention.
Figure 15B:
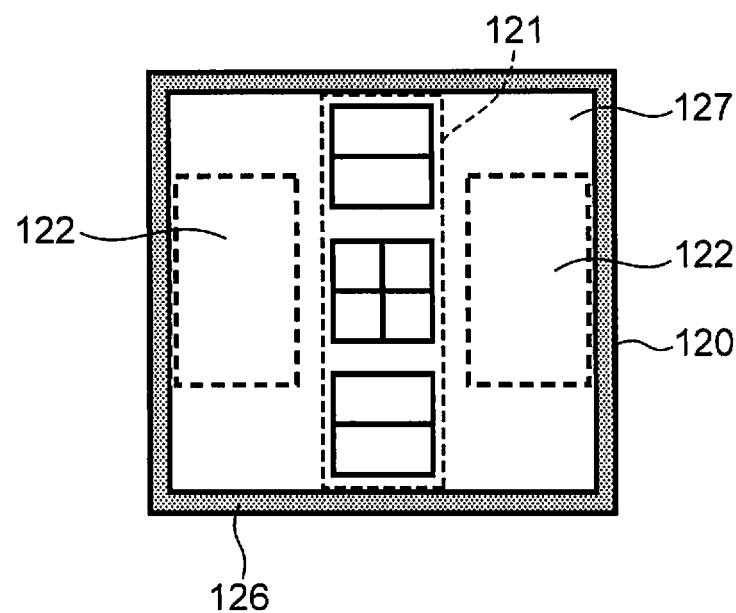
FIG. 15B is a view of the light detector shown in FIG. 15A as seen from the top thereof.

FIG. 14A is a side view showing the configuration of the light detector in a second modified example of Embodiment 1 of the present invention. FIG. 14B is a view of the light detector shown in FIG. 14A as seen from the top thereof. FIG. 15A is a side view showing the configuration of a light detector in a third modified example of Embodiment 1 of the present invention. FIG. 15B is a view of the light detector shown in FIG. 15A as seen from the top thereof.

In the light detector 120 in FIG. 14A, the package 125 is formed of a transparent resin or glass. The light guides 124 of the package 125 are formed not by openings, but by depositing an antireflection film 130 on the incident light beam side surface. Further, in a region (diagonally shaded part of FIG. 14B) of the incident light beam side surface of the package 125 except for the light guides 124, there is formed a light-shield film 129 formed of a metal film or an optical film. At this step, the transmittance of the light-shield film 129 is desirably 10% or less. Whereas, when the adhesive 126 is coated on the entire surface of the substrate 127, and the package 125 and the adhesive 126 are close in refractive index to each other, the transmittances of the package 125 and the adhesive 126 are high. For this reason, it is essential only that the antireflection film 130 of the light guide 124 is deposited only on the incident light beam side of the light guides 124 of the package 125.

On the other hand, when the adhesive 126 is coated only on the peripheral part of the light detector 120 as shown in FIGS. 15A and 15B, the antireflection film 130 is desirably also deposited on the surface of the package 125 opposite to the incident light beam side surface thereof from the viewpoint of transmittance. Desirably, by depositing the antireflection film 130 on the surface of the package 125 opposite to the incident light beam side surface thereof, the transmittance of the light guide 124 becomes 90% or more. With this configuration, the light-receiving unit 121 is closed. Accordingly, dust or the like is not deposited on the light-receiving unit 121. For this reason, it is possible to implement an optical head excellent in reliability. Incidentally, at this step, the antireflection film 130 is deposited on only the regions of the light guides 124. However, it may be configured that the antireflection film 130 is eliminated.

Incidentally, in Embodiment 1, the light detector 120 is configured such that the substrate 127 formed of a silicon wafer, and including the light-receiving unit 121, the computation circuit 122, and the terminal parts 123 connected with the computation circuit 122 by internal wirings such as via holes or side wirings, is bonded with the package 125 having light guides 124 including openings formed therein, and made of a resin, glass, or a metal by the adhesive 126 with precision. However, the configurations shown in FIGS. 16A to 16C are also acceptable.

Figure 16A:
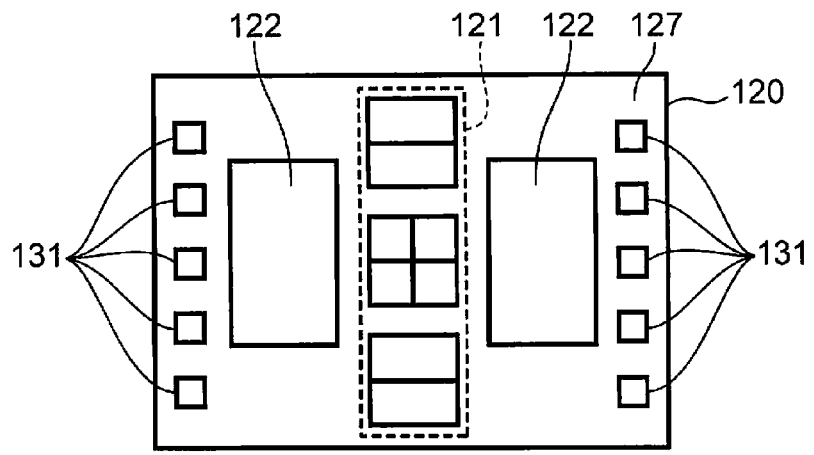
FIG. 16A is a front view showing a configuration of a light detector in a fourth modified example of Embodiment 1 of the present invention.
Figure 16B:
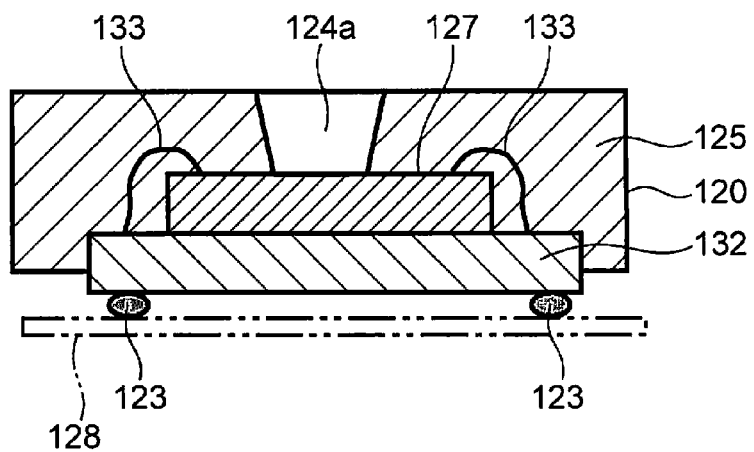
FIG. 16B is a partial cross-sectional view of the light detector shown in FIG. 16A.
Figure 16C:
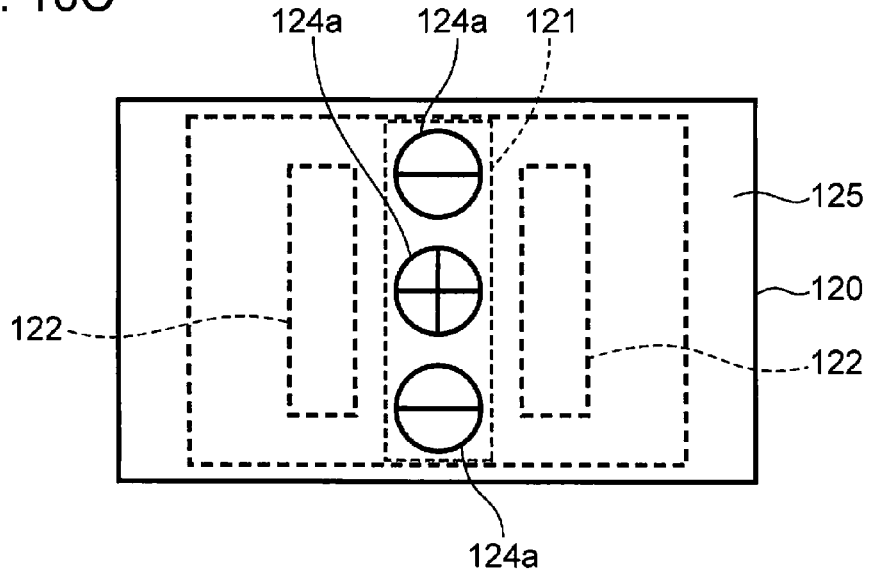
FIG. 16C is a view of the light detector shown in FIG. 16B as seen from the top thereof.

FIG. 16A is a front view showing a configuration of a light detector in a fourth modified example of Embodiment 1 of the present invention, FIG. 16B is a partial cross-sectional view of the light detector shown in FIG. 16A, and FIG. 16C is a view of the light detector shown in FIG. 16B as seen from the top thereof. Incidentally, FIG. 16A shows the light detector 120 from which the package 125 has been removed.

As shown in FIG. 16A, the light detector 120 includes the light-receiving unit 121, the computation circuit 122, and the pad parts 131. In the substrate 127, there are formed the light-receiving unit 121, the computation circuit 122, and the pad parts 131. As shown in FIG. 16B, the pad part 131 and the circuit substrate 132 disposed at the underlying part of the substrate 127 are connected by wire bonding 133. On the circuit substrate 132 capable of pattern formation, the terminal parts 123 are formed. The terminal parts 123 are mounted on a FPC 128.

Whereas, the light-receiving unit 121, the computation circuit 122, the pad part 131, the wire bonding 133, and the circuit substrate 132 are covered with the package 125 formed of a resin. At this step, the resin is desirably silicone or the like less deteriorated in quality with respect to a light beam having a wavelength of 405 nm. Further, the package 125 has a plurality of openings 124a. As shown in FIG. 16C, a plurality of the openings 124a are aligned with respect to respective light-receiving regions of the light-receiving unit 121 with precision. With this configuration, the light detector 120 is increased in size, but is simple in configuration, and hence can be manufactured relatively with ease and at a low cost.

Figure 17A:
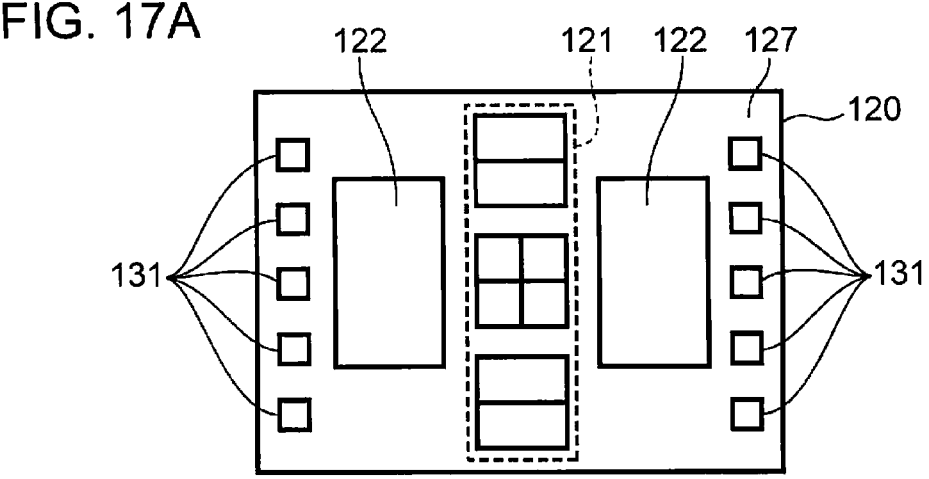
FIG. 17A is a front view showing a configuration of a light detector in a fifth modified example of Embodiment 1 of the present invention.
Figure 17B:
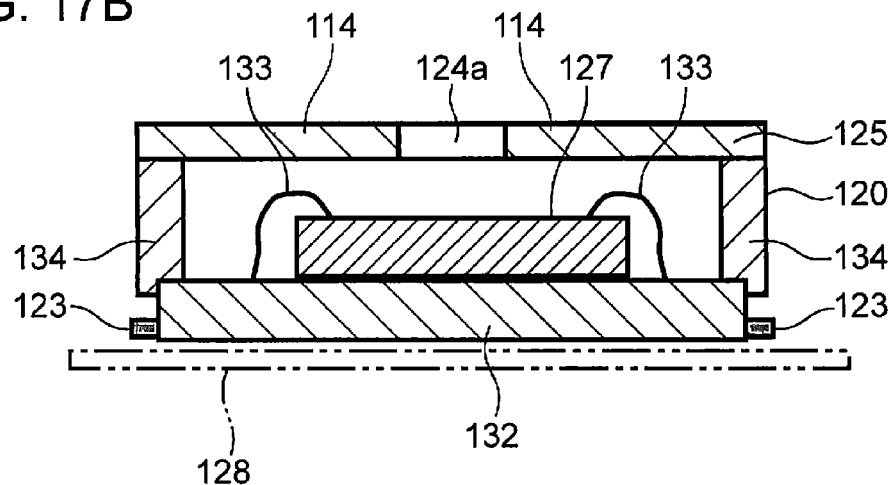
FIG. 17B is a partial cross-sectional view of the light detector shown in FIG. 17A.
Figure 17C:
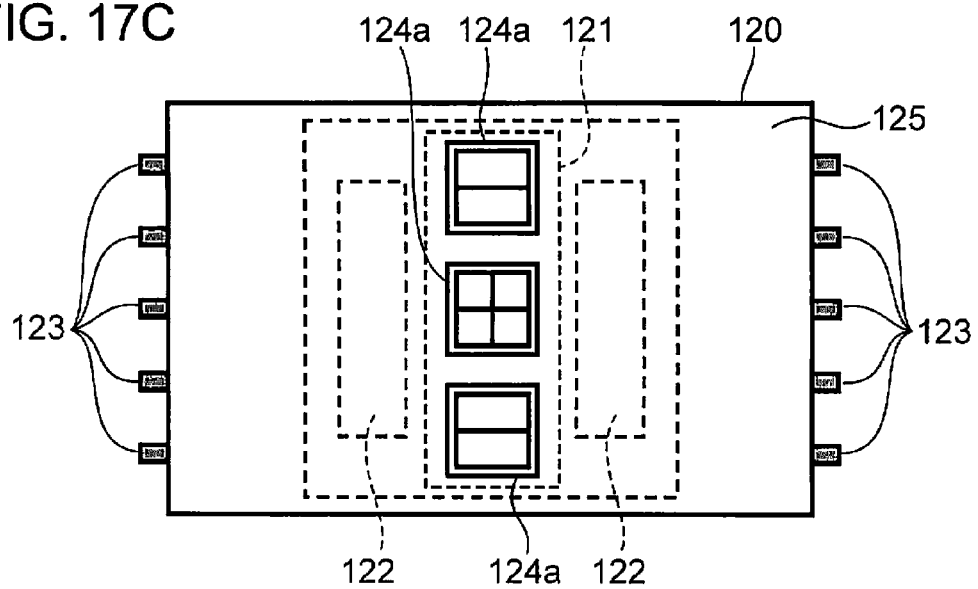
FIG. 17C is a view of the light detector shown in FIG. 17B as seen from the top thereof.

Further, in Embodiment 1, the terminal parts 123, the light guides 124, and the package 125 may be configured as shown in FIGS. 17A to 17C.

FIG. 17A is a front view showing a configuration of a light detector in a fifth modified example of Embodiment 1 of the present invention, FIG. 17B is a partial cross-sectional view of the light detector shown in FIG. 17A, and FIG. 17C is a view of the light detector shown in FIG. 17B as seen from the top thereof. Incidentally, FIG. 17A shows the light detector 120 from which the package 125 and the resin frame 134 have been removed.

As shown in FIG. 17A, the light detector 120 includes the light-receiving unit 121, the computation circuits 122, and the pad parts 131. On the substrate 127, there are formed the light-receiving unit 121, the computation circuits 122, and the pad parts 131. As shown in FIG. 17B, the pad part 131 and the circuit substrate 132 disposed at the underlying part of the substrate 127 are connected by wire bonding 133. On the circuit substrate 132 capable of pattern formation, the terminal parts 123 are formed. The terminal parts 123 are mounted on a FPC 128.

Further, the light-receiving unit 121, the computation circuits 122, the pad parts 131, the wire bonding 133, and the circuit substrate 132 are formed in the inside of the resin frame 134 formed by resin molding. The resin frame 134 is covered with the package 125. Namely, the resin frame 134 is formed along the outer peripheral portion of the circuit substrate 132. On the top part of the resin frame 134, the package 125 is formed in such a manner as to seal the light-receiving unit 121, the computation circuits 122, the pad parts 131, the wire bonding 133, and the circuit substrate 132 in the inside thereof. The package 125 is formed of a metal such as aluminum or iron, and has a plurality of openings 124a. As shown in FIG. 17C, a plurality of the openings 124a are aligned with respect to respective light-receiving regions of the light-receiving unit 121 with precision.

With this configuration, it becomes possible to form the package 125 with a metal. Accordingly, even a light beam having a wavelength of 405 nm does not deteriorate the package 125. For this reason, although the size of the light detector 120 is increased, it is possible to implement the light detector 120 excellent in reliability.

Further, in the optical head of Embodiment 1 of FIGS. 2B, 14A, 15A, and 16B, there is adopted a so-called BGA (ball grid array) configuration in which the terminal parts 123 are disposed on the bottom surface of the light detector 120. However, as shown in FIG. 17B, the terminal parts 123 may be disposed at the side surfaces of the light detector 120.

Whereas, in each optical head of Embodiment 1 of FIGS. 2C, 14B, 15A, and 16C, the shape of the light guide 124 is a circular shape, but may be a non-circular shape so as to block stray lights as much as possible. The shape of the light guide 124 may be, for example, a tetragonal shape shown in FIG. 17, elliptical shape, or a non-circular shape such as a triangular shape or a fan shape. By forming the light guide 124 in a non-circular shape, it is possible to still more block an other-layer stray light with precision. For this reason, it is possible to implement an optical head stable in servo signal.

Incidentally, in Embodiment 1, it is naturally understood that, as the oscillation wavelength of the semiconductor laser 101 serving as a light source, generally 780 nm for CD, generally 650 nm for DVD, or generally 405 nm for BD is applicable.

Incidentally, Embodiment 1 exerts more remarkable effects by being applied to a optical head for recording or reproducing information on a multilayer media of three- or more layers, and large in magnification of the detection optical system. However, Embodiment 1 is not prevented from being applied to other optical heads such as an optical head low in detection magnification or an optical head for recording or reproducing information on monolayer or dual-layer media. The other optical heads can reduce the stray lights incident on the light-receiving unit of the light detector as with the optical head of Embodiment 1.

Embodiment 2

Then, a description will be given to the optical head in Embodiment 2 of the present invention.

The optical head in Embodiment 2 is different in detection system of a tracking error signal from that of Embodiment 1. In Embodiment 1, a tracking error signal is detected by a so-called 3-beam method using the diffraction grating 102. However, in Embodiment 2, a tracking error signal is detected by a so-called 1-beam method (APP (advanced push-pull) method) using a hologram element. Further, with the change in detection system of a tracking error signal, the arrangement of respective light-receiving regions of the light-receiving unit 121, and the arrangement of a plurality of the light guides 124 vary.

Figure 18:
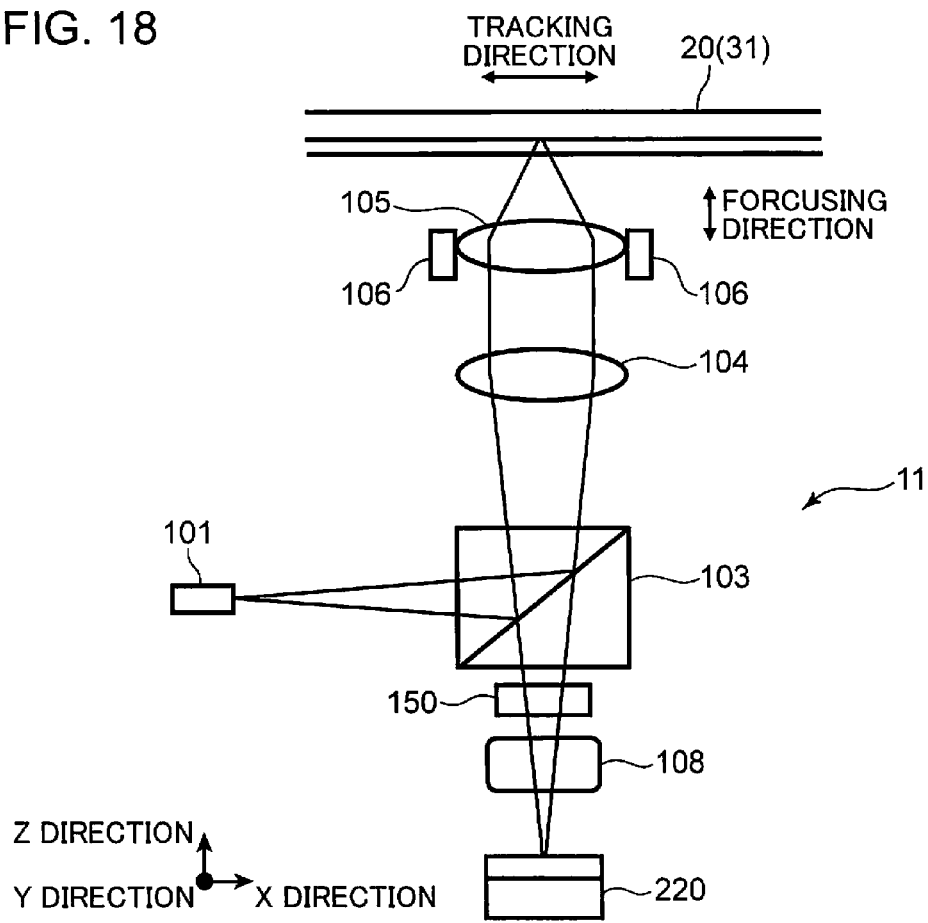
FIG. 18 is a view showing a configuration of an optical system of an optical head in Embodiment 2 of the present invention.

FIG. 18 is a view showing a configuration of the optical system in Embodiment 2 of the present invention. In FIG. 18, the optical head 11 includes the semiconductor laser 101, the beam splitter 103, the collimator lens 104, the objective lens 105, the objective lens actuator 106, the cylindrical lens 108, the hologram element 150, and the light detector 220.

The semiconductor laser 101 emits a light beam with an oscillation wavelength of about 405 nm. The hologram element 150 is disposed between the beam splitter 103 and the cylindrical lens 108, and divides the light beam into light beams for generating a tracking error signal by a so-called 1-beam method (APP method). The hologram element 150 is disposed between the objective lens 105 and the cylindrical lens 108, and divides the reflected light beam reflected at the optical disc 21.

The light beam emitted from the semiconductor laser 101 is reflected at the beam splitter 103, and then, is converted into a parallel light beam at the collimator lens 104. The parallel light beam is incident on the objective lens 105. The objective lens 105 converges the light beams emitted from the semiconductor laser 101 to the optical disc 21. The objective lens 105 is driven by the objective lens actuator 106 (not shown in details) in the optical axis direction (focus direction) and in the tracking direction (radial direction) of the optical disc 21.

The light beam reflected and diffracted at the recording layer of the optical disc 21 passes through the objective lens 105 and the collimator lens 104 again, and is incident on the beam splitter 103. The light beam which has passed through the beam splitter 103 is divided into a plurality of light beams by the hologram element 150, which are incident on the cylindrical lens 108. The cylindrical lens 108 causes an astigmatism in a reflected light beam reflected at the optical disc 21. The light beam which has passed through the cylindrical lens 108 is incident on the light detector 120. The light detector 120 detects the reflected light beam having an astigmatism caused therein by the cylindrical lens 108.

Figure 19:
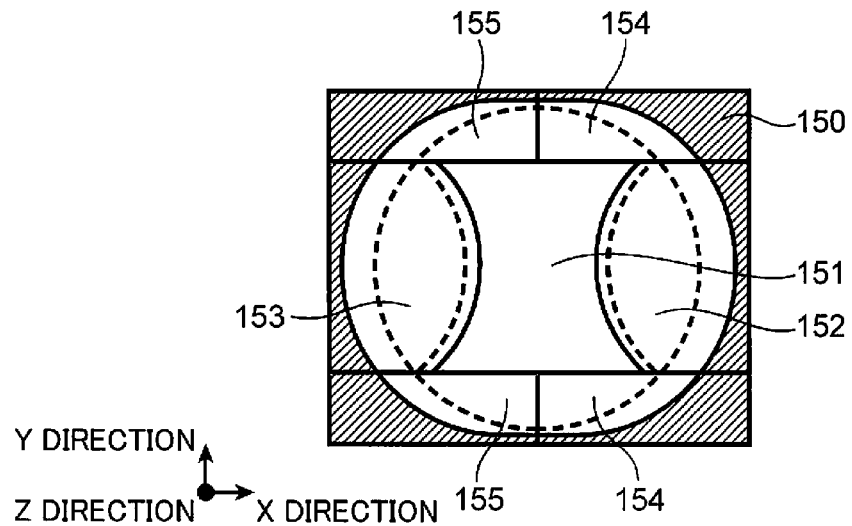
FIG. 19 is a view showing a configuration of a hologram element shown in FIG. 18.

FIG. 19 is a view showing the configuration of the hologram element 150 shown in FIG. 18. The solid line indicates the division pattern of the hologram element 150, and the broken line indicates the shape of the light beam passing through the hologram element 150. The hologram element 150 includes a main beam region 151 for receiving the main beam, first and second APP main regions 152 and 153 for receiving the interference light of ±first-order lights and 0th-order light diffracted at the recording layer of the optical disc 21 (31), and first and second APP sub-regions 154 and 155 for receiving only the 0th-order light.

Figure 20A:
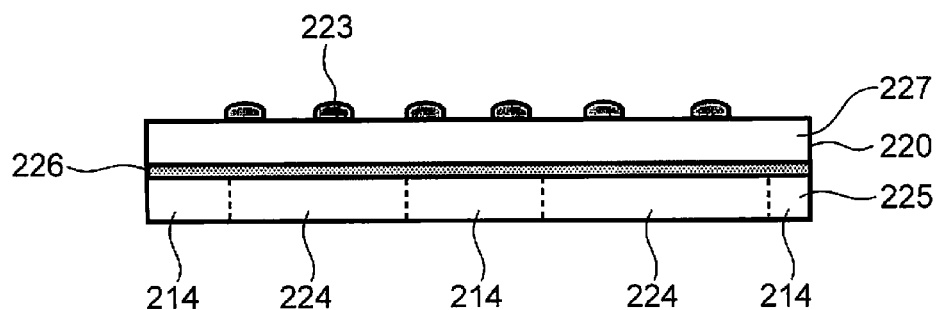
FIG. 20A is a side view showing a configuration of a light detector in Embodiment 2 of the present invention.
Figure 20B:
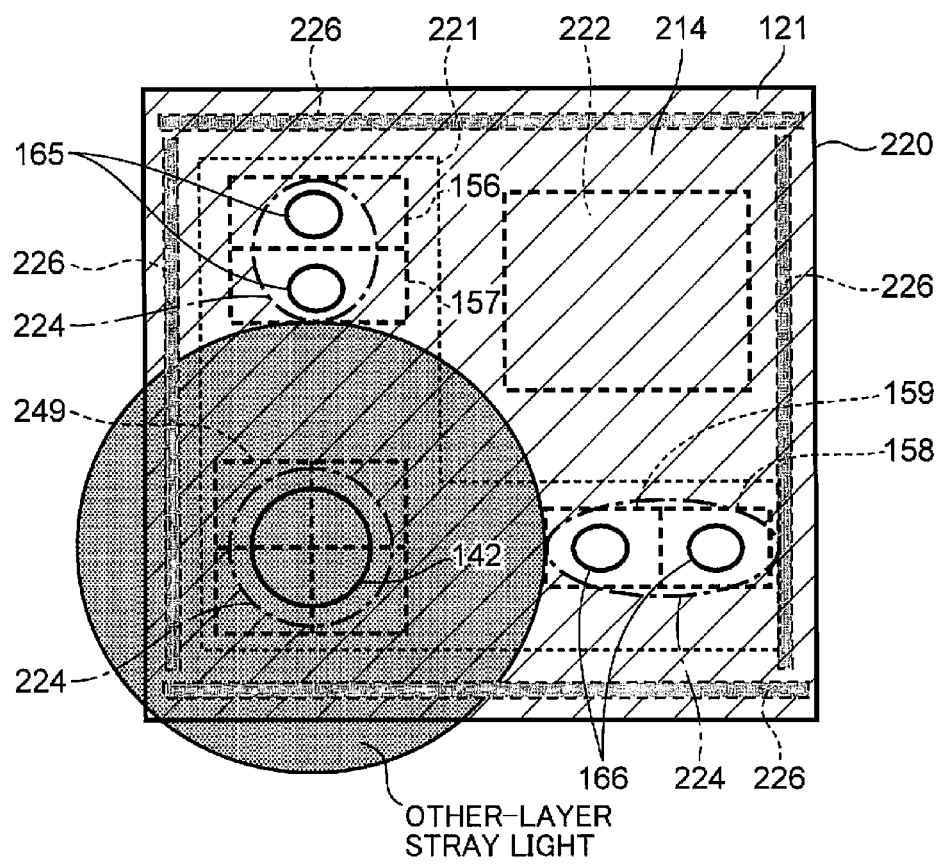
FIG. 20B is a front view showing a configuration of the light detector in Embodiment 2 of the present invention.

FIG. 20A is a side view showing a configuration of a light detector in Embodiment 2 of the present invention. FIG. 20B is a front view showing the configuration of the light detector in Embodiment 2 of the present invention. FIGS. 20A and 20B show the relative positional relationship between the light-receiving unit 221 of the light detector 220 and the light guides 224 of the package 225.

The light detector 220 includes the light-receiving unit 221, the computation circuit 222, the terminal parts 223, and the package 225. The light-receiving unit 221 receives the reflected light beam reflected at the optical disc 21. The computation circuit 222 performs a prescribed computation on an electric signal obtained by photoelectrically transducing a light beam received at the light-receiving unit 221. The package 225 covers the light-receiving unit 221 and the computation circuit 222.

The package 225 has a plurality of light guides 224 formed on the light-receiving surface on the light beam incident side of the light-receiving unit 221, and for guiding a reflected light beam to the light-receiving unit 221, and a light shield 214 for shielding a region except for a plurality of the light guides 224 from light.

On the substrate 227 made of a silicon wafer or the like, there are formed the light-receiving unit 221, the computation circuit 222, and the terminal parts 223. The package 225 formed of a resin such as silicone, glass, or a metal is bonded onto the substrate 227 by an adhesive 226. On the surface on the light incident side of the substrate 227, there are formed the light-receiving unit 221 and the computation circuit 222. On the surface opposite to the light incident side surface, there are formed the terminal parts 223.

In FIG. 20B, the shape of the light guide 224 is indicated with an alternate ling and short dash line, and the light shield 214 for shielding against the incident light beam is indicated with oblique lines. The light shield 214 desirably has a transmittance of 10% or less.

The light-receiving unit 221 includes the quadrant light-receiving region 240, the first APP main beam light-receiving region 156, the second APP main beam light-receiving region 157, the first APP sub-beam light-receiving region 158, and the second APP sub-beam light-receiving region 159. The light beams which have passed through respective divided regions of the hologram element 150 are incident on their respective light-receiving regions, respectively. The light beam (main beam 142) which has passed through the main beam region 151 is incident on the quadrant light-receiving region 240. The light beams (APP main beam 165) which have passed through the first and second APP main regions 152 and 153 are incident on the first APP main beam light-receiving region 156 and the second APP main beam light-receiving region 157, respectively. The light beams (APP sub-beams 166) which have passed through the first and second APP sub-regions 154 and 155 are incident on the first APP sub-beam light-receiving region 158 and the second APP sub-beam light-receiving region 159, respectively.

The light-receiving unit 221 includes a plurality of light-receiving regions. In the package 225, light guides 224 are each independently formed for light beams incident on respective light-receiving regions of the light-receiving unit 221. In FIG. 20B, three light guides 224 respectively corresponding to the main beam 142, the APP main beam 165, and the APP sub-beam 166 are formed in the package 225. Alternatively, light guides 224 may be disposed in respective light-receiving regions of the light-receiving unit 221.

Each shape of a plurality of the light guides 224 is a circular shape or an ellipse shape. The shape of the light guide 224 corresponding to the quadrant light-receiving region 240 is a circular shape. Each shape of the light guides 224 corresponding to the first and second APP main beam light-receiving regions 156 and 157 is an ellipse shape. Each shape of the light guides 224 corresponding to the first and second APP sub-beam light-receiving regions 158 and 159 is an ellipse shape.

Computation of the differential between the diagonal sum signals of the quadrant light-receiving region 240 generates a focus error signal. Computation of the sum of all the signals of the quadrant light-receiving region 240 generates an RF signal.

On the other hand, for the tracking error signal, the determination of the differential between mutual signals of the first and second APP main beam light-receiving regions 156 and 157 generates a so-called push-pull signal. The resulting push-pull signal and the signals from the first and second APP sub-beam light-receiving regions 158 and 159 are computed, thereby generating a tracking error signal in a so-called APP method.

Figure 21:
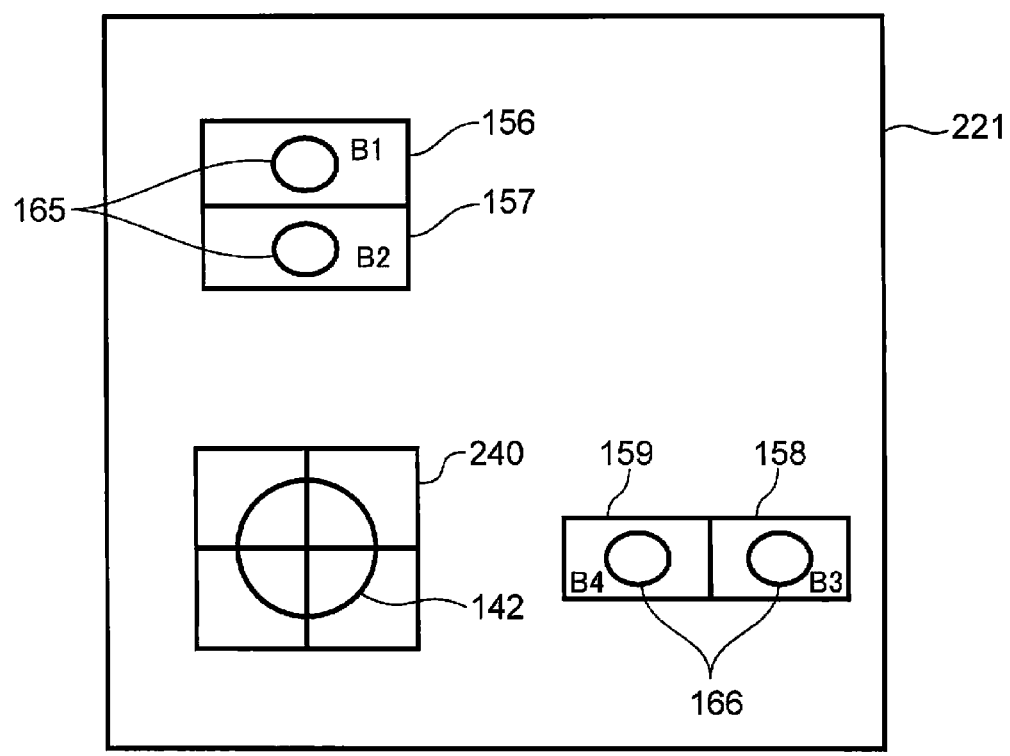
FIG. 21 is a view for illustrating a computation method of a tacking error signal in Embodiment 2 of the present invention.

At this step, in order to prevent an other-layer stray light from being incident on the first and second APP main beam light-receiving regions 156 and 157, and the first and second APP sub-beam light-receiving regions 158 and 159 which are the light-receiving regions for generating a tracking error signal, the quadrant light-receiving region 240, the first and second APP main beam light-receiving regions 156 and 157, and the first and second APP sub-beam light-receiving regions 158 and 159 are spaced from one another. Further, for the reduction of the thickness of the optical head 10, respective light-receiving regions are disposed in an L shape. At this step, the optical axis center is the center of the quadrant light-receiving region 240. FIG. 21 is a view for illustrating the computation method of a tracking error signal in Embodiment 2 of the present invention.

In Embodiment 2, the tracking error signal is calculated based on the following equation (3).

$$\text{Tracking error signal}=(B1-B2)-k(B3-B4) \qquad (3)$$

Incidentally, in the equation (3), B1 represents the output from the first APP main beam light-receiving region 156, B2 represents the output from the second APP main beam light-receiving region 157, B3 represents the output from the first APP sub-beam light-receiving region 158, B4 represents the output from the second APP sub-beam light-receiving region 159, and k represents the gain. Incidentally, the gain k is generally set at 0.5 to 5.

With this configuration, even for an optical head for which a tracking error signal is detected by the APP method, the tracking error signal becomes a servo signal not affected by the interference with the other-layer stray light. Thus, it is possible to implement an optical head having stable recording performance and reproduction performance.

Incidentally, the shapes of a plurality of the light guides 224 in Embodiment 2 were circular and ellipse shapes. However, it does not matter if the shapes are non-circular shapes such as a tetragonal shape, a triangular shape, or a fan shape as with Embodiment 1. Alternatively, the shapes of a plurality of the light guides 224 may be all circular shapes, or respectively different shapes.

Whereas, the adhesive 226 may be coated entirely on the surface of the substrate 227, or may be coated on only the peripheral part of the substrate 227. Whereas, the material for the adhesive 226 is selected by the balance of the transmittance due to the combination of the configurations of the package 225, the light guides 224, and the adhesive 226, the quality deterioration of the adhesive 226 against a light with a wavelength of 405 nm, and the bonding strength as with Embodiment 1.

Incidentally, in the present embodiment, the objective lens 105 corresponds to one example of the objective lens, the cylindrical lens 108 corresponds to one example of the astigmatism causing unit, the hologram element 150 corresponds to one example of the light beam dividing unit, the light detector 220 corresponds to one example of the light detector, the light-receiving unit 221 corresponds to one example of the light-receiving unit, the package 225 corresponds to one example of the package, a plurality of the light guides 224 correspond to one example of a plurality of the light guides, the light shield 214 corresponds to one example of the light shield, the quadrant light-receiving region 240 corresponds to one example of the main beam light-receiving unit, the first and second APP main beam light-receiving regions 156 and 157 correspond to one example of the first sub-beam light-receiving unit, and the first and second APP sub-beam light-receiving regions 158 and 159 correspond to one example of the second sub-beam light-receiving unit.

Figure 22:
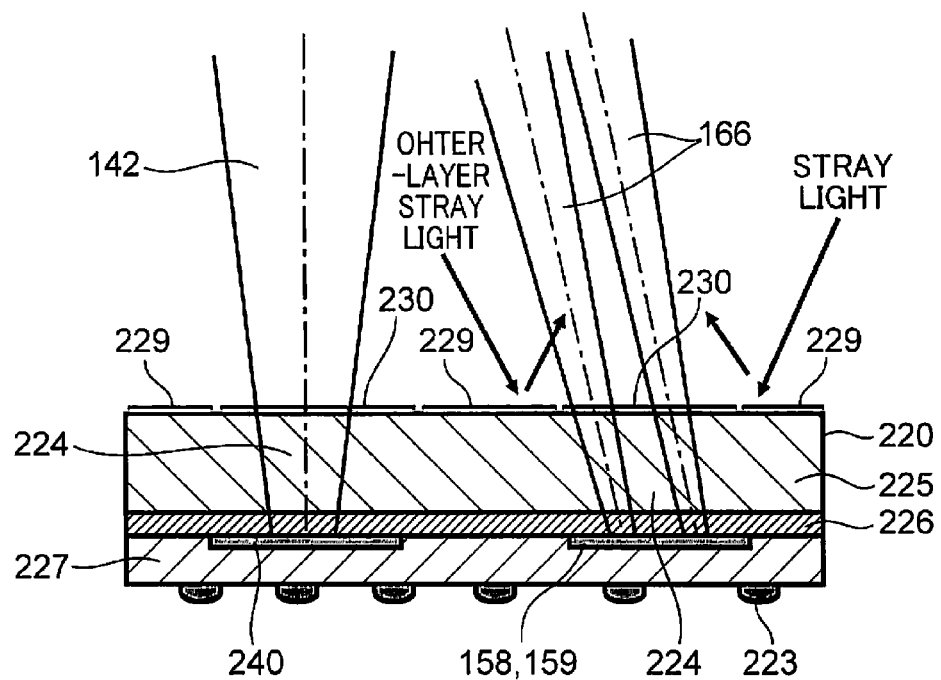
FIG. 22 is a cross-sectional view showing a configuration of the light detector in Embodiment 2 of the present invention.
Figure 23:
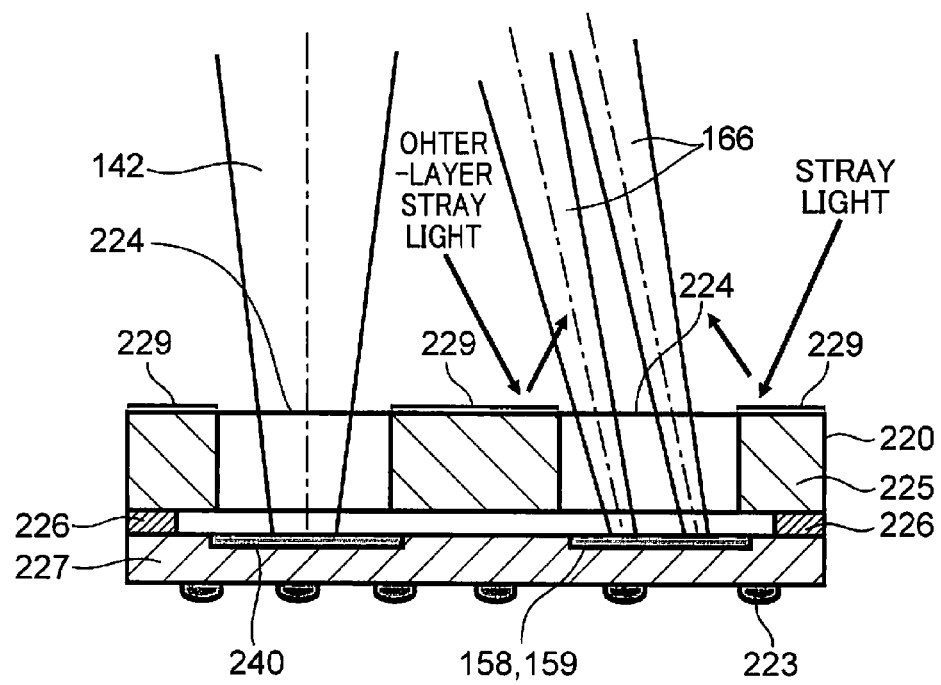
FIG. 23 is a cross-sectional view showing a configuration of a light detector in a modified example of Embodiment 2 of the present invention.

FIG. 22 is a cross-sectional view showing a configuration of a light detector in Embodiment 2 of the present invention. FIG. 23 is a cross-sectional view showing a configuration of a light detector in a modified example of Embodiment 2 of the present invention. Further, FIGS. 22 and 23 each show the cross section including the center of the quadrant light-receiving region 240, and the centers of the first and second APP sub-beam light-receiving regions 158 and 159. As shown in FIG. 22, as with Embodiment 1, the antireflection film 230 is deposited on transparent glass or a transparent resin, thereby forming the light guides 224 in the package 225. Alternatively, as shown in FIG. 23, by forming openings in a metal or an opaque resin, the light guides 224 may be formed in the package 225.

At this step, on the region of the surface of the package 225 except for the light guides 224, there is deposited a light-shield film (light shield) 229 for shielding against a stray light. Incidentally, a stray light may be blocked not by the deposition of the light-shield film 229, but by the characteristic of the transmittance of the material forming the package 225. At this step, the transmittance of the light-shield film 229 is desirably 10% or less. Further, in FIG. 22, the light guide 224 has the antireflection film 230 only on the surface on the incident light beam side. However, when the difference in refractive index between the package 225 and the adhesive 226 is large, another antireflection film is also required to be deposited on the surface of the package 225 opposite to the surface on the incident light beam side thereof. The transmittance of the light guides 224 after deposition of the antireflection film is desirably 90% or more. Alternatively, when the transmittance is sacrificed, the antireflection film 230 to be deposited on the light guides 224 may be eliminated.

Embodiment 3

Then, a description will be given to an optical head in Embodiment 3 of the present invention. With the optical head in Embodiment 3, the computation circuit is entirely shielded from light. Incidentally, the configuration of the optical head in Embodiment 3 is equal to that of the optical head shown in FIG. 18.

Figure 24A:
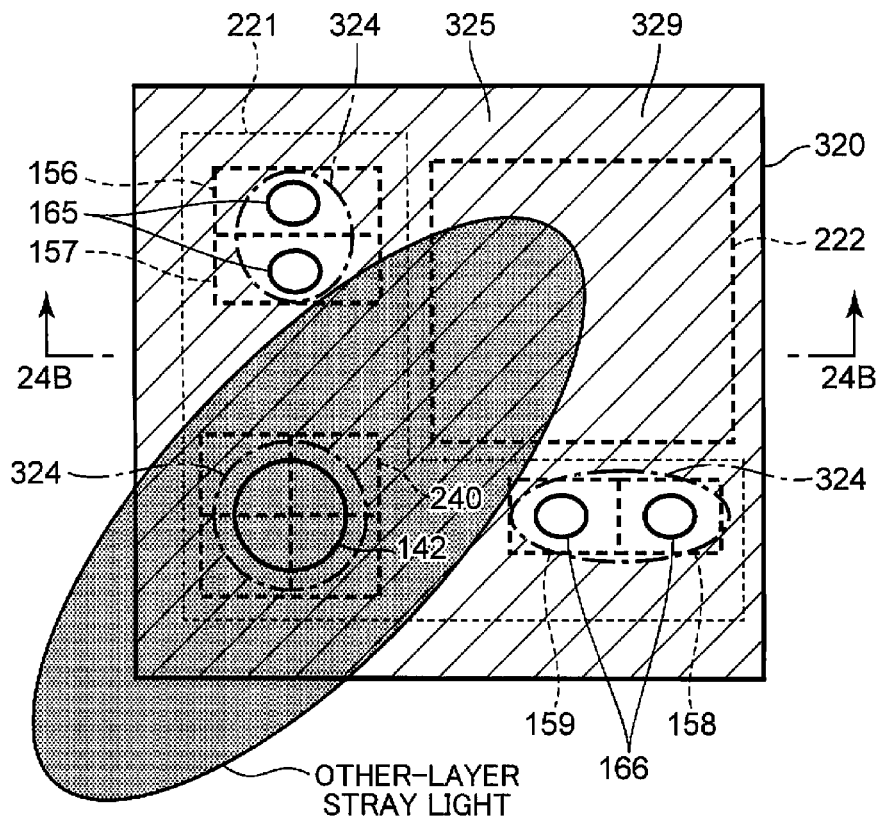
FIG. 24A is a front view showing a configuration of a light detector in Embodiment 3 of the present invention.
Figure 24B:
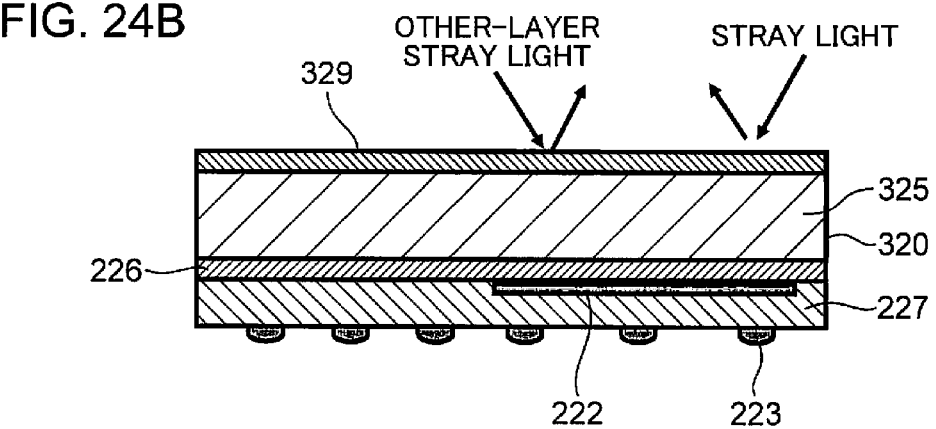
FIG. 24B is a cross-sectional view along line 24B-24B of the light detector shown in FIG. 24A.

FIG. 24A is a front view showing a configuration of a light detector in Embodiment 3 of the present invention. FIG. 24B is a cross-sectional view along line 24B-24B of the light detector shown in FIG. 24A.

The light detector 320 includes a light-receiving unit 221, a computation circuit 222, terminal parts 223, and a package 325. The light-receiving unit 221 receives a reflected light beam reflected at the optical disc 31. The computation circuit 222 performs a prescribed computation on an electric signal obtained by photoelectrically transducing a reflected light beam received at the light-receiving unit 221. The package 325 covers the light-receiving unit 221 and the computation circuit 222.

On the substrate 227 made of a silicon wafer or the like, there are formed the light-receiving unit 221, the computation circuit 222, and the terminal parts 223. The package 325 formed of a resin such as silicone, glass, or a metal is bonded onto the substrate 227 by an adhesive 226. On the surface on the light incident side of the substrate 227, there are formed the light-receiving unit 221 and the computation circuit 222. On the surface opposite to the light incident side surface, there are formed the terminal parts 223.

In the package 325 on the light-receiving surface on the light beam incident side of the light-receiving unit 221, there are formed a plurality of light guides 324. In FIG. 24A, each shape of the light guides 324 is indicated with an alternate long and short dash line.

The light-receiving unit 221 includes a quadrant light-receiving region 240, a first APP main beam light-receiving region 156, a second APP main beam light-receiving region 157, a first APP sub-beam light-receiving region 158, and a second APP sub-beam light-receiving region 159.

FIG. 24A is a view of the light detector 320 as seen from the incident light beam side. The other-layer stray light from the optical disc 31 becomes in a diagonally ellipse shape due to the amount of defocus at the recording layer of the optical disc 31. The other-layer stray light is also incident on the computation circuit 322. At this step, when a stray light is incident on the amplifier part of the computation circuit 322, a noise is generated in the output signal. The generation of offsets in the focus error signal, the tracking error signal, and the RF signal largely deteriorates the recording characteristics and the reproduction characteristics.

Under such circumstances, in Embodiment 3, as shown in FIG. 24B, a light shield (light-shield film) 329 is deposited on a region of the surface of the package 325 made of transparent glass or a transparent resin except for the light guides 324. At this step, the transmittance of the light shield 329 is desirably 10% or less. Whereas, the transmittance of the light guides 324 is desirably 90% or more. It is shown that, with this configuration, the other-layer stray light and the stray light is reflected at the light shield 329 without being incident on the computation circuit 322.

Incidentally, a plurality of the light guides 324 may be formed of openings formed in the package 325. Alternatively, when the package 325 is formed of transparent glass or a transparent resin, a plurality of the light guides 324 may be formed by not forming the light shield 329 only in the regions corresponding to a plurality of the light guides 324. Still alternatively, when the package 325 is formed of transparent glass or a transparent resin, a plurality of the light guides 324 may be formed by forming antireflection films only at regions corresponding to a plurality of the light guides 324.

Incidentally, in the present embodiment, the light detector 320 corresponds to one example of the light detector. The light-receiving unit 221 corresponds to one example of the light-receiving unit. The package 325 corresponds to one example of the package. A plurality of the light guides 324 correspond to one example of a plurality of light guides. The light shield 329 corresponds to one example of the light shield. The quadrant light-receiving region 240 corresponds to one example of the main beam light-receiving unit. The first and second APP main beam light-receiving regions 156 and 157 correspond to one example of the first sub-beam light-receiving unit. The first and second APP sub-beam light-receiving regions 158 and 159 correspond to one example of the second sub-beam light-receiving unit. The computation circuit 322 corresponds to one example of the computation unit.

Figure 25:
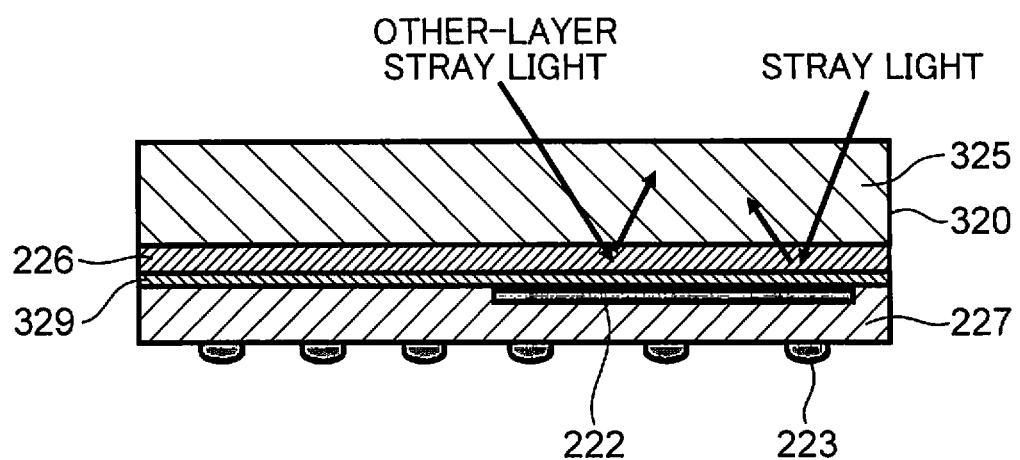
FIG. 25 is a side view showing a configuration of a light detector in a modified example of Embodiment 3 of the present invention.

FIG. 25 is a cross-sectional view showing a configuration of a light detector in a modified example of Embodiment 3 of the present invention. As shown in FIG. 24B, in Embodiment 3, the light shield 329 is formed on the incident light beam side of the package 325. In contrast, as shown in the modified example of Embodiment 3 of FIG. 25, it may also be configured such that the light shield (aluminum reflection film or optical film) 329 is deposited on the surface of the computation circuit 222. Namely, the light shield 329 may be formed between the substrate 227 including the light-receiving unit 221 and the computation circuit 222, and the adhesive 226. At this step, the transmittance of the light shield 329 is desirably 10% or less. The transmittance of the package 325 is desirably 90% or more. Alternatively, in order to enhance the transmittance of the package 325, it may also be configured such that an antireflection film is deposited on the surface on the incident light beam side and/or the surface opposite to the surface on the incident light beam side of the package 325.

Embodiment 4

Then, a description will be given to an optical head in Embodiment 4 of the present invention. The optical head in Embodiment 4 is different from that of Embodiment 3 in that at least one of a plurality of the light guides is formed in the package on the incident light beam side of the computation circuit. Incidentally, the configuration of the optical head in Embodiment 4 is equal to that of the optical head shown in FIG. 18.

Figure 26A:
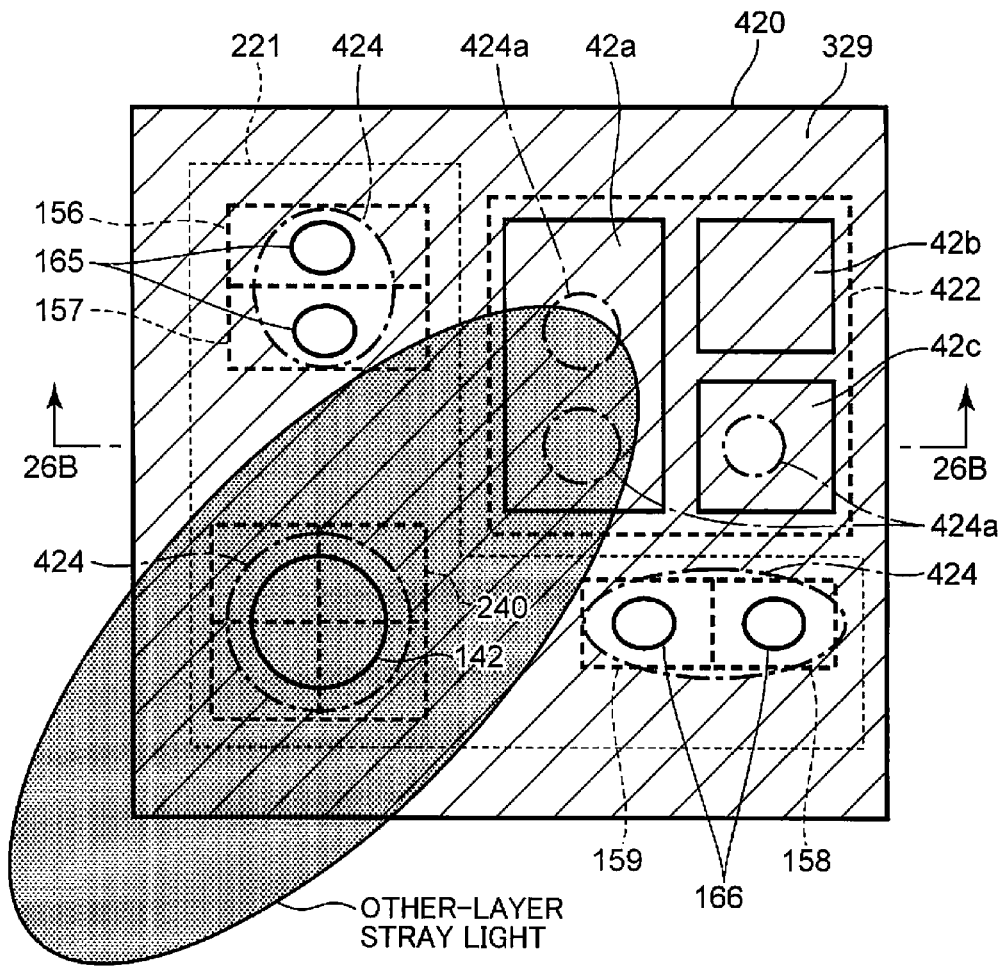
FIG. 26A is a front view showing a configuration of a light detector in Embodiment 4 of the present invention.
Figure 26B:
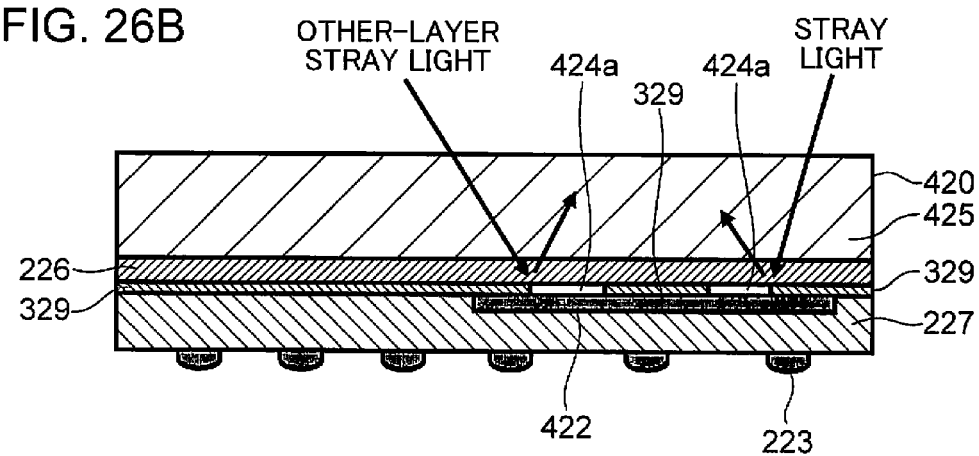
FIG. 26B is a cross-sectional view along line 26B-26B of the light detector shown in FIG. 26A.

FIG. 26A is a front view showing a configuration of a light detector in Embodiment 4 of the present invention. FIG. 26B is a cross-sectional view along line 26B-26B of the light detector shown in FIG. 26A.

The light detector 420 includes a light-receiving unit 221, a computation circuit 422, terminal parts 223, and a package 425. The light-receiving unit 221 receives a reflected light beam reflected at the optical disc 31. The computation circuit 422 performs a prescribed computation on an electric signal obtained by photoelectrically transducing a reflected light beam received at the light-receiving unit 221. The package 425 covers the light-receiving unit 221 and the computation circuit 422.

The computation circuit 422 includes a first computation circuit 42a for generating a focus error signal, a second computation circuit 42b for generating a tracking error signal, and a third computation circuit 42c for generating a reproduction signal of the optical disc 31.

On the substrate 227 made of a silicon wafer or the like, there are formed the light-receiving unit 221, the computation circuit 422, and the terminal parts 223. The package 425 formed of a resin such as silicone, glass, or a metal is bonded onto the substrate 227 by an adhesive 226. On the surface on the light incident side of the substrate 227, there are formed the light-receiving unit 221 and the computation circuit 422. On the surface opposite to the light incident side surface, there are formed the terminal parts 223.

In FIG. 26A, the light-receiving unit 421 includes the quadrant light-receiving region 240 for receiving the main beam, the first and second APP main beam light-receiving regions 156 and 157 for receiving the APP main beam 165, and the first and second APP sub-beam light-receiving regions 158 and 159 for receiving the APP sub-beam 166.

Computation of the differential between the diagonal sum signals of the quadrant light-receiving region 240 generates a focus error signal. Computation of the sum of all the signals of the quadrant light-receiving region 240 generates an RF signal.

On the other hand, for the tracking error signal, the determination of the differential between mutual signals of the first and second APP main beam light-receiving regions 156 and 157 generates a so-called push-pull signal. The resulting push-pull signal and the signals from the first and second APP sub-beam light-receiving regions 158 and 159 are computed, thereby generating a tracking error signal in a so-called APP method. At this step, output signals from respective individual light-receiving regions are inputted to the computation circuit 422. A computation processing is performed at the computation circuit 422 formed of a multilayered circuit of summing amplifiers, differential amplifiers, amplification amplifiers, an the like.

The computation circuit 422 is formed of a first computation circuit 42a for performing a computation on a signal corresponding to the light quantity of the light beam received at the quadrant light-receiving region 240, and thereby generating a focus error signal, the second computation circuit 42b for performing a computation on signals corresponding to the light quantities of the light beams received at the first and second APP main beam light-receiving regions 156 and 157, and the first and second APP sub-beam light-receiving regions 158 and 159, and generating a tracking error signal, and the third computation circuit 42c for generating a reproduction signal of the recording layer of the optical disc 21 (31)

using the output signals from the first computation circuit 42a and/or the second computation circuit 42b.

In the package 425 on the light-receiving surface on the light beam incident side of the light-receiving unit 221, there are formed a plurality of light guides 424. Whereas, in the package 425 on the circuit surface on the light beam incident side of the third computation circuit 42c, there are formed a plurality of openings 424a. Namely, the package 425 has a plurality of light guides 424 formed on the light-receiving surface on the light beam incident side of the light-receiving unit 221, and guiding a reflected light beam to the light-receiving unit 221, the light shield 329 for shielding a region except for a plurality of the light guides 424 from light, and openings 424 formed on the circuit surface on the light beam incident side of the third computation circuit 42c. In FIG. 26A, the shapes of the light guides 424 and the opening 424a are indicated with alternate long and short dash lines.

On the surface of the computation circuit 422, the light shield 329 is disposed. The light shield 329 is formed of a metal film of aluminum or the like. For the optical disc 21 (31) for BD, when the reproduction rate is 6-speed or more, the frequency response required upon deterioration of the reproduction signal by −3 dB is 130 MHz or more. When a metal film is present on the amplifiers of the first computation circuit 42a for generating a signal to be the source for an RF signal, and the third computation circuit 42c for performing the computation of an RF signal, the frequency response is deteriorated to 100 MHz or less under influence of the very little load capacity of the metal film.

Under such circumstances, in some portions of the surfaces of the amplifiers of the first computation circuit 42a and the third computation circuit 42c regarding the computation for generating a reproduction signal, the openings 424a are formed. With this configuration, the frequency response is prevented from being reduced by the load capacity which the deposited film of a metal such as aluminum has.

With this configuration, it is possible to implement an optical head more stable in recording characteristics and reproduction characteristics. In addition, it is possible to implement an optical head capable of providing the reproduction characteristic excellent in frequency response, and adaptable to the high speed reproduction.

Incidentally, in the present embodiment, the light detector 420 corresponds to one example of the light detector. The light-receiving unit 221 corresponds to one example of the light-receiving unit. The package 425 corresponds to one example of the package. A plurality of the light guides 424 correspond to one example of a plurality of light guides. The opening 424a corresponds to one example of the opening. The light shield 329 corresponds to one example of the light shield. The quadrant light-receiving region 240 corresponds to one example of the main beam light-receiving unit. The first and second APP main beam light-receiving regions 156 and 157 correspond to one example of the first sub-beam light-receiving unit. The first and second APP sub-beam light-receiving regions 158 and 159 correspond to one example of the second sub-beam light-receiving unit. The computation circuit 422 corresponds to one example of the computation unit. The first computation circuit 42a corresponds to one example of the first computation circuit. The second computation circuit 42b corresponds to one example of the second computation circuit. The third computation circuit 42c corresponds to one example of the third computation circuit.

Incidentally, when the package 425 is formed of transparent glass or a transparent resin, the light shield 329 is not formed at only the regions corresponding to the openings 424a, resulting in the formation of the openings 424a.

Further, in Embodiment 4, the surface shape of the opening 424a formed on the circuit surface on the incident light beam side of the third computation circuit 42c may be a circular shape, or a non-circular shape such as a rectangular shape, a fan shape, or a triangular shape. Whereas, a plurality of the light guides 424 formed on the light-receiving surface on the incident light beam side of the light-receiving unit 221, and the openings 424a formed on the circuit surface on the incident light beam side of the computation circuit 422 may be formed with mutually different materials and methods. For example, a plurality of the light guides 424 formed on the light-receiving surface on the incident light beam side of the light-receiving unit 221 may be an optical film such as an antireflection film.

Further, in the present embodiment, there are disposed the openings 424a respectively adaptable to the first computation circuit 42a and the third computation circuit 42c. However, the present invention is not particularly limited thereto. There may be disposed the opening 424a adaptable to only the third computation circuit 42c.

Whereas, in the optical head of Embodiment 1, the package may have an opening on the circuit surface on the light beam incident side of the third computation circuit.

Embodiment 5

Then, a description will be given to an optical head in Embodiment 5 of the present invention. Different point from Embodiments 1 to 4 is in that not only a light source for emitting a light having a wavelength of 405 nm for BD, but also a light source for emitting a light having a wavelength of 650 nm for DVD, and a light source for emitting a light having a wavelength of 780 nm for CD are mounted, thereby implementing a configuration adaptable to multilayer BD, DVD, and CD.

Figure 27:
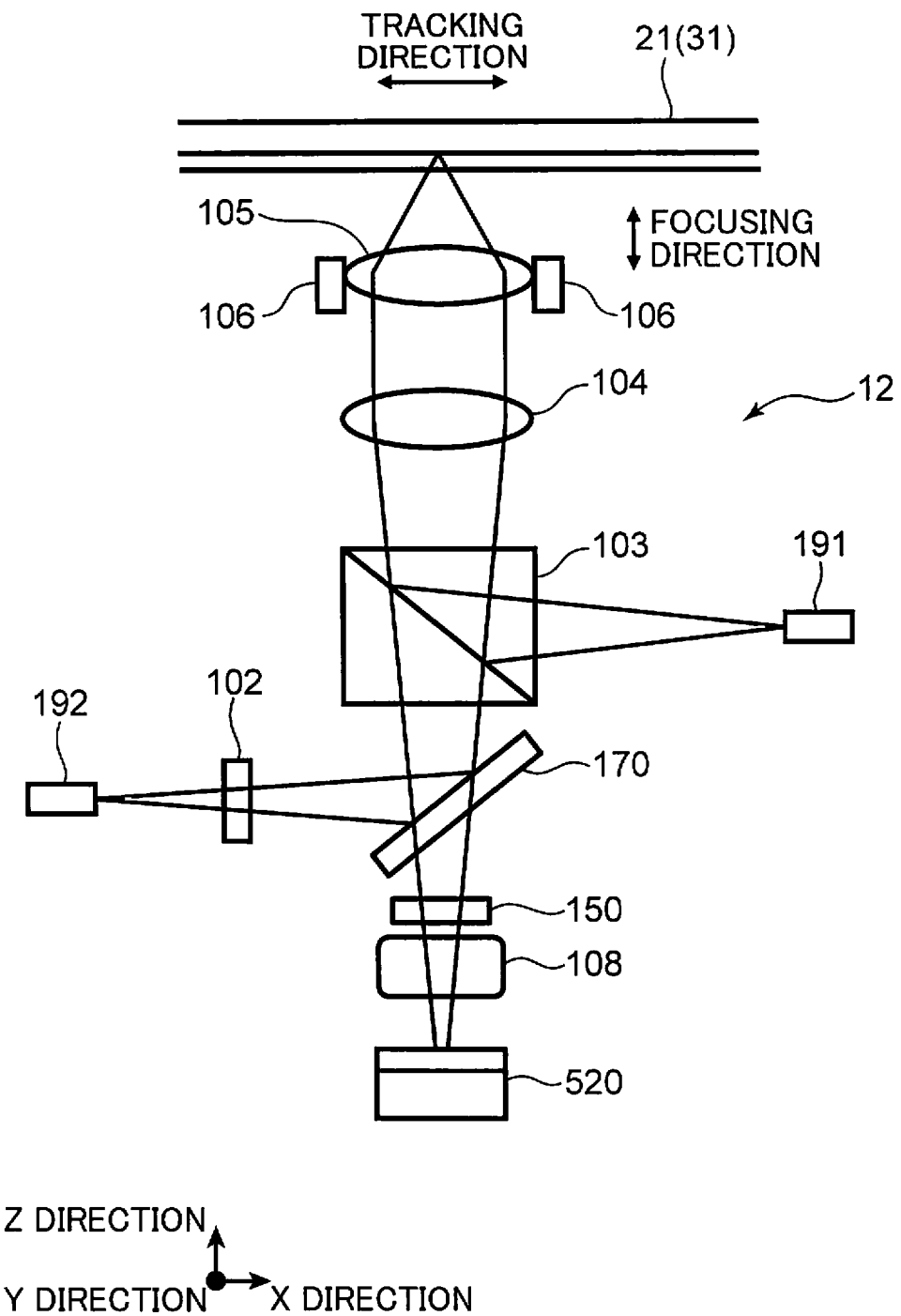
FIG. 27 is a view showing a configuration of an optical system of an optical head in Embodiment 5 of the present invention.

FIG. 27 is a view showing a configuration of an optical system of an optical head in Embodiment 5 of the present invention. In FIG. 27, the optical head 12 includes a diffraction grating 102, a beam splitter 103, a collimator lens 104, an objective lens 105, an objective lens actuator 106, a cylindrical lens 108, a hologram element 150, a plate beam splitter 170, a blue semiconductor laser 191, a double wavelength semiconductor laser 192, and a light detector 520.

The blue semiconductor laser 191 emits a blue light having a wavelength of 405 nm. The double wavelength semiconductor laser 192 emits a red light having a wavelength of 650 nm, and emits an infrared light having a wavelength of 780 nm.

The plate beam splitter 170 reflects a red light or an infrared light emitted from the double wavelength semiconductor laser 192 toward the objective lens 105, and transmits the reflected light (blue light, red light, or infrared light) reflected by the optical disc 21 (31) therethrough. The light detector 520 detects the reflected light beam having astigmatism caused therein by the cylindrical lens 108.

Figure 28:
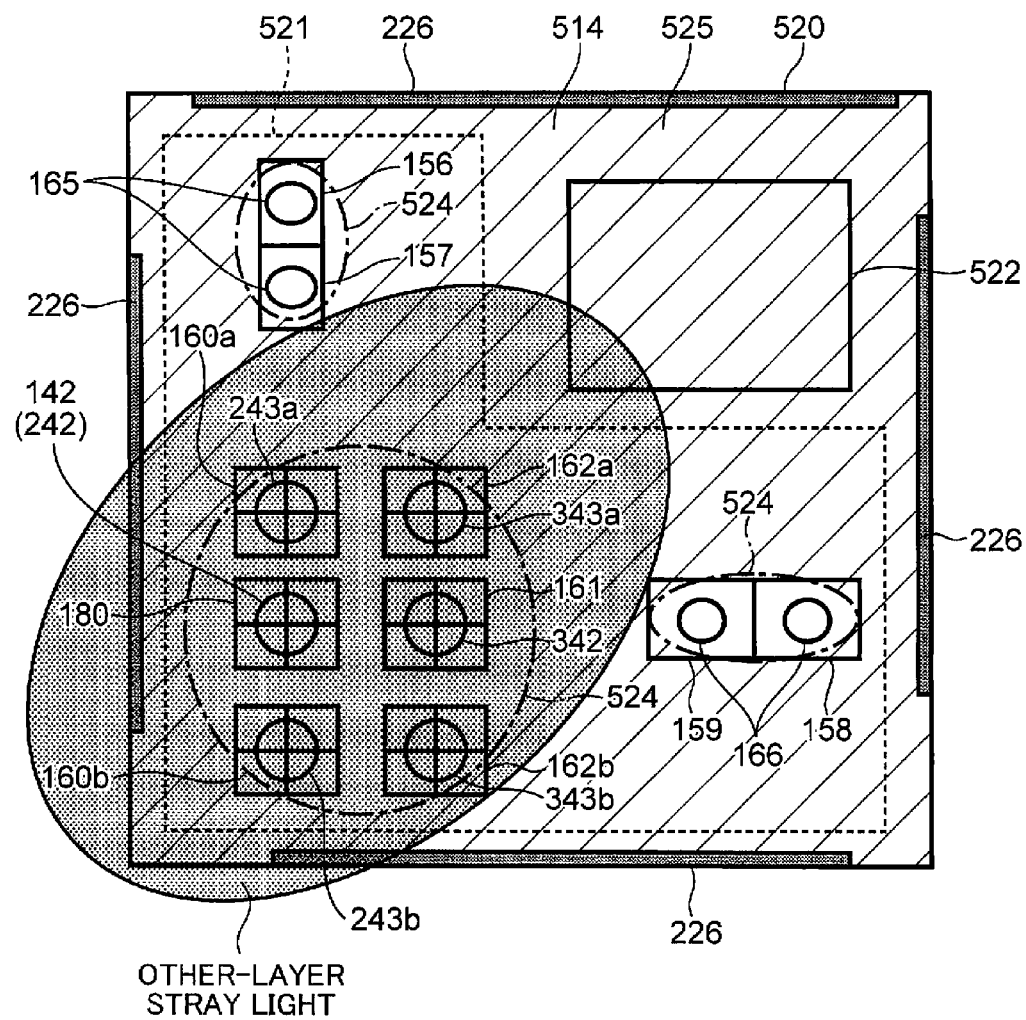
FIG. 28 is a front view showing a configuration of a light detector in Embodiment 5 of the present invention.
Figure 29:
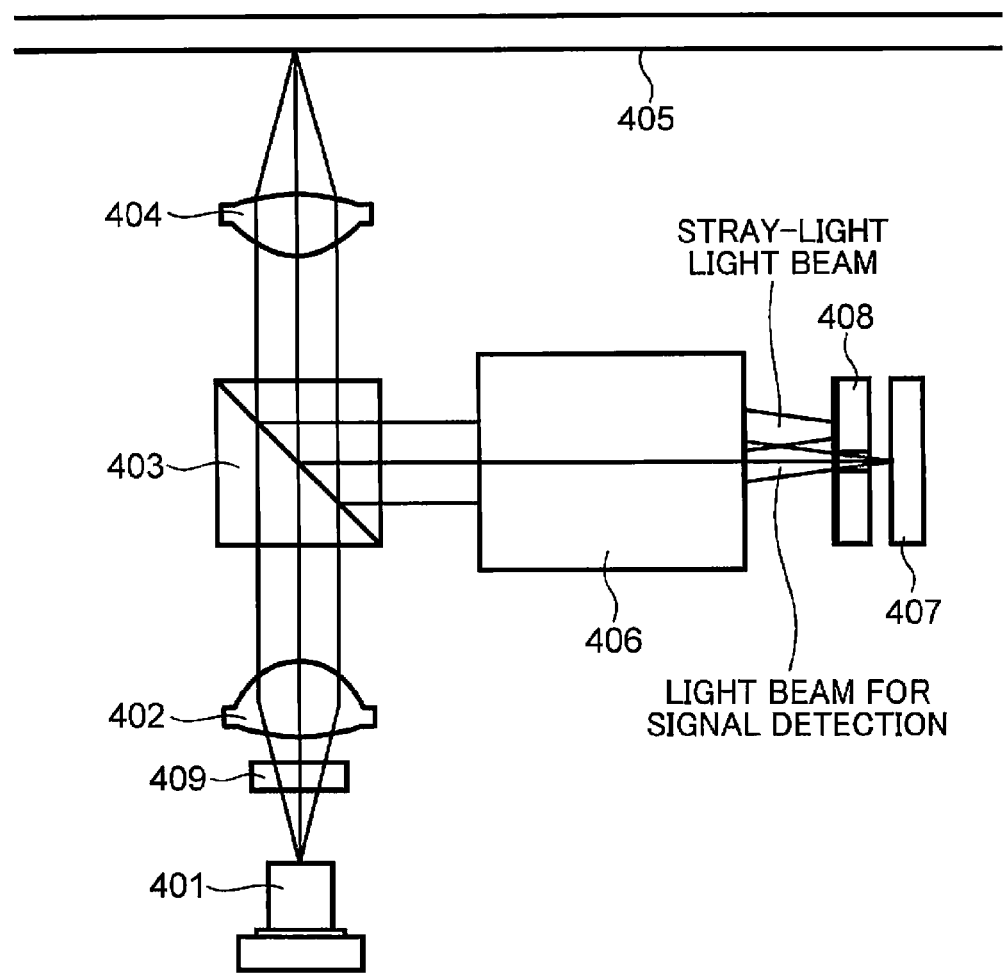
FIG. 29 is a view showing a configuration of an optical system of a conventional optical head.
Figure 30:
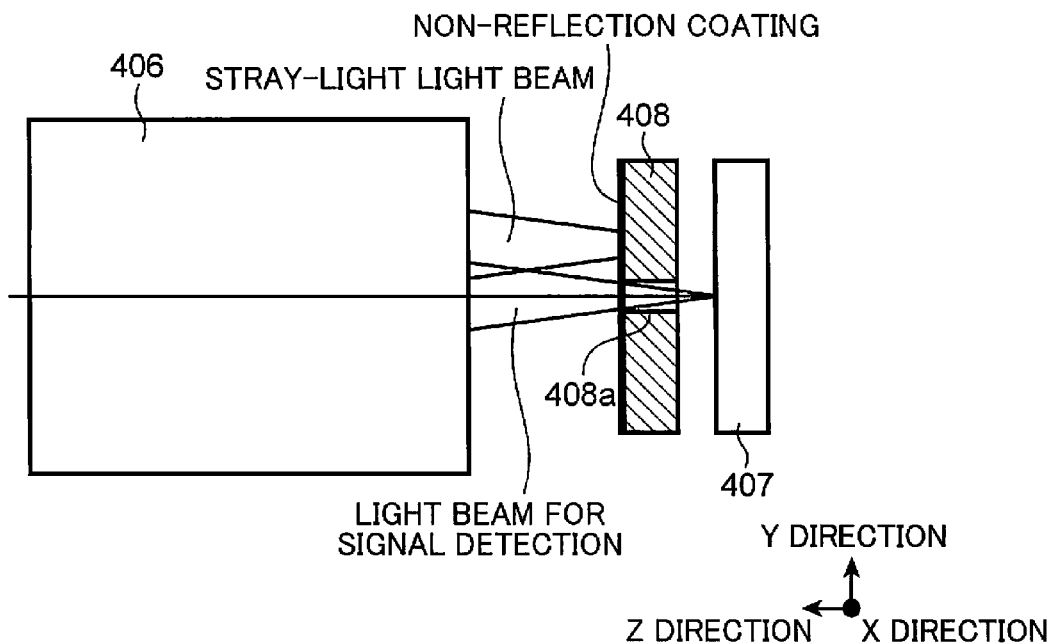
FIG. 30 is a view showing the details of a detection optical system of the conventional optical head.
Figure 31:
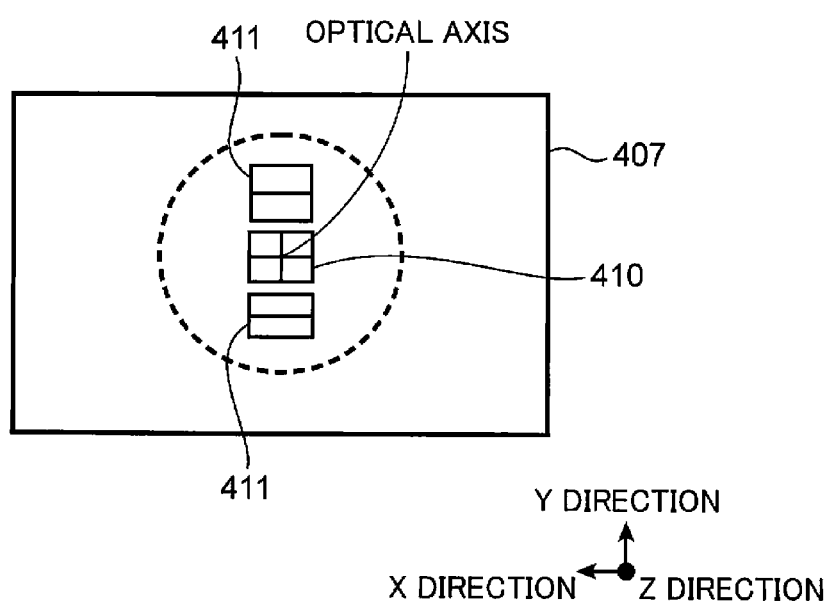
FIG. 31 is a view showing the light-receiving surface of a light detector of the conventional optical head.
Figure 32:
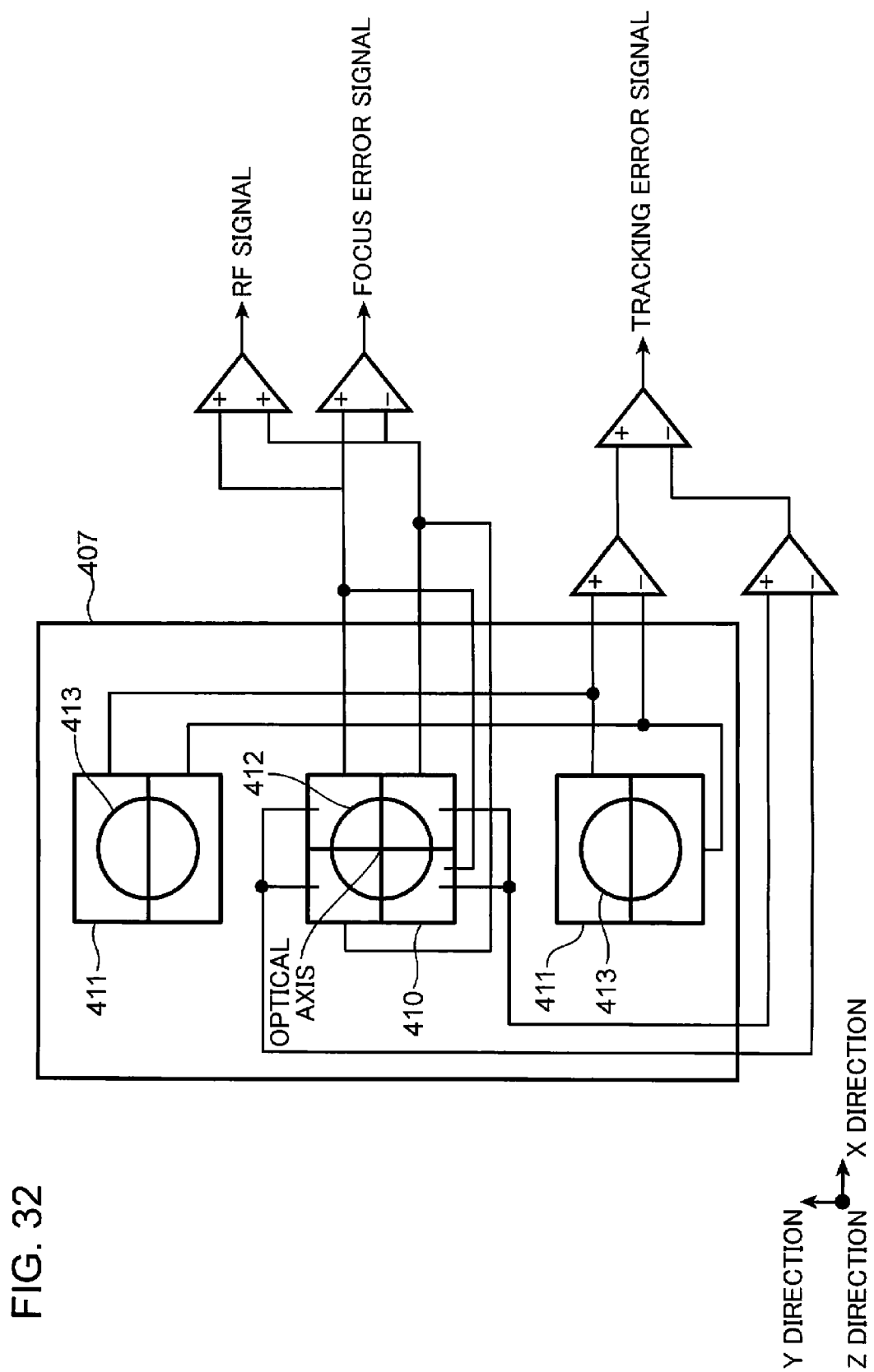
FIG. 32 is a view showing the arrangement of a light-receiving unit at the light-receiving surface of the light detector of the conventional optical head.
Figure 33:
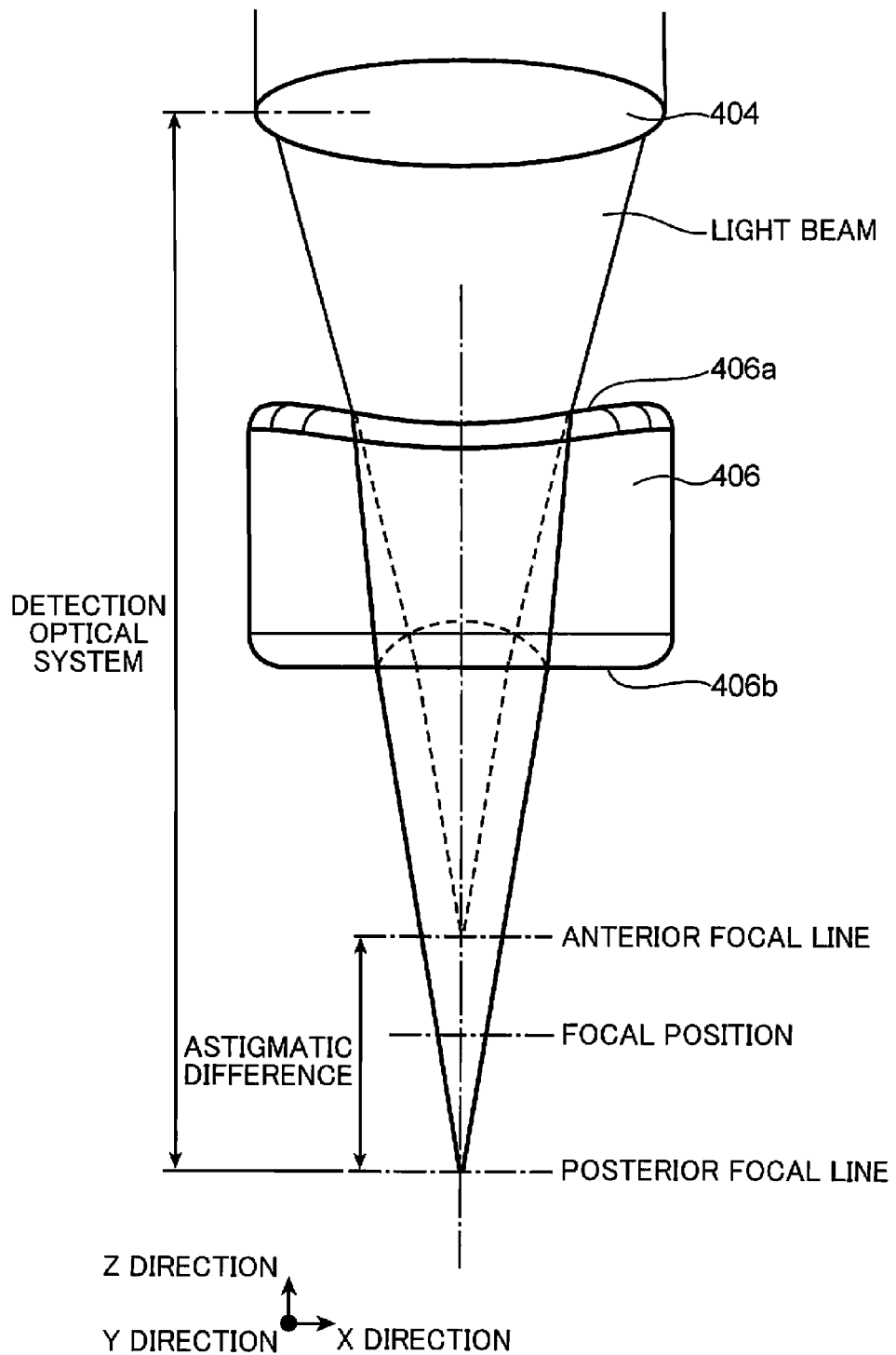
FIG. 33 is a view showing the detection optical system of the conventional optical head.
Figure 34:
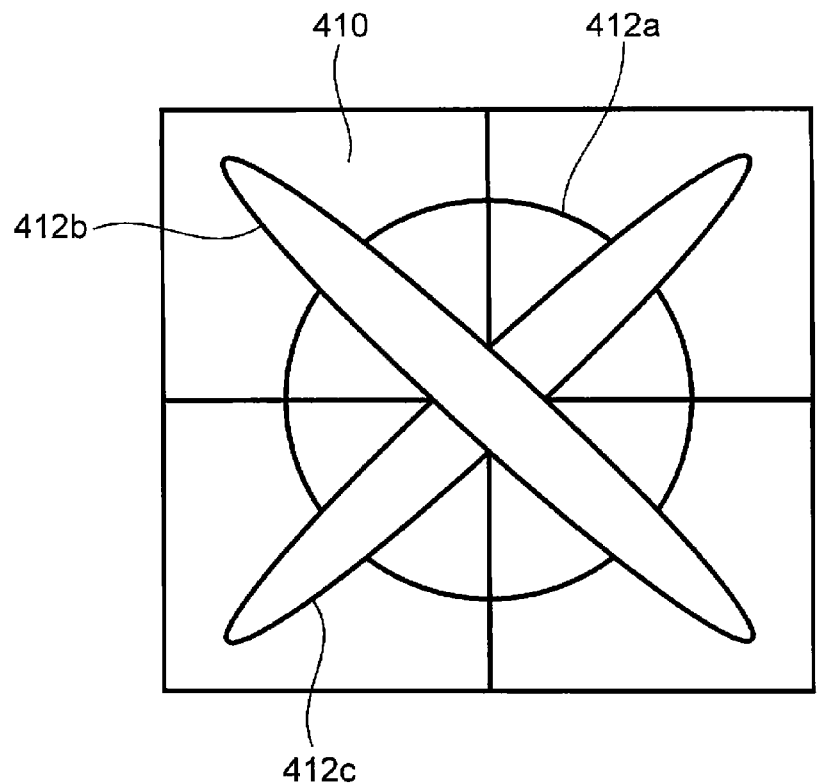
FIG. 34 is a view showing a light beam formed at a quadrant light-receiving unit of the light detector of the conventional optical head.
Figure 35:
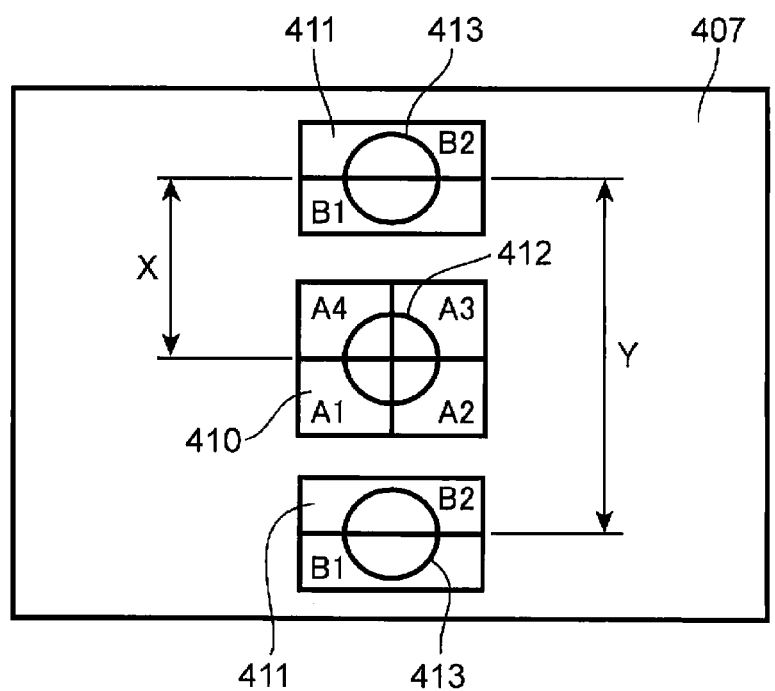
FIG. 35 is a view for illustrating the relationship between the magnification of the detection optical system and the distance from the main beam to the sub-beam on the light detector, and the relationship between the magnification of the detection optical system and the distance between two sub-beams on the light detector.

The configurations of the light detector 520 of such an optical head including three-wavelength light sources mounted thereon, and the light guide 524 formed on the incident light beam side of the light detector 520 will be described by reference to FIG. 28. FIG. 28 is a front view showing the configuration of the light detector in Embodiment 5 of the present invention.

The light detector 520 includes a light-receiving unit 521, a computation circuit 522, terminal parts (not shown), and a package 525. The light-receiving unit 521 receives a reflected light beam reflected at the optical disc 21 (31). The computation circuit 522 performs a prescribed computation on an electric signal obtained by photoelectrically transducing a reflected light beam received at the light-receiving unit 521. The package 525 covers the light-receiving unit 521 and the computation circuit 522.

On a substrate (not shown) made of a silicon wafer or the like, there are formed the light-receiving unit 521, the computation circuit 522, and the terminal parts. The package 525 formed of a resin such as silicone, glass, or a metal is bonded onto the substrate by the adhesive 226. On the surface on the light incident side of the substrate, there are formed the light-receiving unit 521 and the computation circuit 522. On the surface opposite to the light incident side surface, there are formed the terminal parts.

The package 525 has a plurality of the light guide 524 formed on the light-receiving surface on the light beam incident side of the light-receiving unit 521, and for guiding a reflected light beam to the light-receiving unit 521, and a light shield 514 for shielding a region except for a plurality of the light guide 524 from light. In FIG. 28, the shape of the opening 524 is indicated with an alternate long and short dash line, and the light shield 514 is indicated with oblique lines.

A region except for the light guide 524 is shielded by a light-shield film, a resin, or a metal from light. The light guide 524 transmits an incident light beam therethrough. At this step, the transmittance of the light shield 514 is desirably 10% or less. The transmittance of the light guide 524 is desirably 90% or more.

The light-receiving unit 521 includes a first quadrant light-receiving region 180, a second quadrant light-receiving region 161, a first APP main beam light-receiving region 156, a second APP main beam light-receiving region 157, a first APP sub-beam light-receiving region 158, a second APP sub-beam light-receiving region 159, a first sub-beam light-receiving region 160a, a second sub-beam light-receiving region 160b, a third sub-beam light-receiving region 162a, and a fourth sub-beam light-receiving region 162b.

The first quadrant light-receiving region 180 receives a main beam 142 of a blue light having a wavelength of 405 nm, and receives a main beam 242 of a red light having a wavelength of 650 nm. The first and second APP main beam light-receiving regions 156 and 157 each receive an APP main beam 165 of a blue light having a wavelength of 405 nm. The first and second APP sub-beam light-receiving regions 158 and 159 each receive an APP sub-beam 166 of a blue light having a wavelength of 405 nm.

The first sub-beam light-receiving region 160a receives a first sub-beam 243a of a red light having a wavelength of 650 nm. The second sub-beam light-receiving region 160b receives a second sub-beam 243b of a red light having a wavelength of 650 nm. Based on the main beam 242, a focus error signal is detected. In addition, based on a push-pull signal of the main beam 242 and signals of the first sub-beam 243a and the second sub-beam 243b, a tracking error signal in a so-called 3-beam method is detected.

Further, the second quadrant light-receiving region 161 receives a main beam 342 of an infrared light having a wavelength of 780 nm. The third sub-beam light-receiving region 162a receives a first sub-beam 343a of an infrared light having a wavelength of 780 nm. The fourth sub-beam light-receiving region 162b receives a second sub-beam 343b of an infrared light having a wavelength of 780 nm. Based on the main beam 342, a focus error signal is detected. In addition, based on a push-pull signal of the main beam 342, and signals of the first sub-beam 343a and the second sub-beam 343b, a tracking error signal in a so-called 3-beam method is detected.

At this step, there is formed one light guide 524 for transmitting therethrough light beams incident on the first quadrant light-receiving region 180, the second quadrant light-receiving region 161, the first sub-beam light-receiving region 160a, the second sub-beam light-receiving region 160b, the third sub-beam light-receiving region 162a, and the fourth sub-beam light-receiving region 162b. Whereas, there is formed one light guide 524 for transmitting therethrough light beams incident on the first and second APP main beam light-receiving regions 156 and 157. There is formed one light guide 524 for transmitting therethrough light beams incident on the first and second APP sub-beam light-receiving regions 158 and 159. Further, the light shield 514 is formed in a region except for the light guides 524.

With the configuration of Embodiment 5, it becomes possible to record or reproduce information on optical discs (BD, DVD, and CD) adaptable to different three wavelengths. In addition, it also becomes possible to record or reproduce information not only on monolayer and dual-layer optical discs, but also on the multilayer optical disc 31. As a result, it is possible to implement an optical head excellent in recording characteristics and reproduction characteristics.

Incidentally, the tracking error signal detection method of BD in Embodiment 5 is assumed to be the 1-beam method (APP method), but may also be the 3-beam method.

Alternatively, in the optical head of Embodiment 5, at least one of a plurality of the light guides 524 may be formed on the circuit surface on the light beam incident side of the third computation circuit.

Further, each shape of a plurality of the light guides 524 is the same as that in Embodiments 2 to 4. The formation method of a plurality of the light guides 524 is also the same as that in Embodiments 2 to 4.

Further, the optical disc drive 20 shown in FIG. 7 may include any optical head of Embodiments 2 to 5.

Incidentally, the foregoing specific embodiments mainly include the inventions having the following configurations.

An optical head in accordance with one aspect of the present invention is an optical head for reproducing information from an information recording medium having two or more recording layers. The optical head includes: a light source for emitting a light beam; an objective lens for converging the light beam emitted from the light source to the information recording medium; an astigmatism causing unit for causing an astigmatism in a reflected light beam reflected at the information recording medium; a light beam dividing unit for dividing an incident light beam; and a light detector for detecting the reflected light beam including the astigmatism caused therein by the astigmatism causing unit. The light detector includes: a light-receiving unit for receiving the reflected light beam, and a package for covering the light-receiving unit. The package has a plurality of light guides formed on a light-receiving surface on a light beam incident side of the light-receiving unit, and for guiding the reflected light beam to the light-receiving unit, and a light shield for shielding a region except for a plurality of the light guides from light.

With this configuration, the light source emits a light beam. The objective lens converges the light beam emitted from the light source to the information recording medium. The astigmatism causing unit causes an astigmatism in a reflected light beam reflected at the information recording medium. The light beam dividing unit divides any one of the light beam emitted from the light source, and the reflected light beam reflected at the information recording medium. The light detector detects the reflected light beam having an astigmatism caused therein by the astigmatism causing unit. The light detector includes the light-receiving unit for receiving a reflected light beam, and the package for covering the light-receiving unit. The package has a plurality of light guides formed on a light-receiving surface on a light beam incident side of the light-receiving unit, and for guiding the reflected light beam to the light-receiving unit, and a light shield for shielding a region except for a plurality of the light guides from light.

Therefore, the light guides are formed on the light-receiving surface on the light beam incident side of the light-receiving unit. For this reason, it is possible to downsize the optical head as compared with the configuration including an aperture other than the light detector. Further, a plurality of the light guides are formed on the light-receiving surface on the light beam incident side of the light-receiving unit. This can prevent a stray light from being incident on the light-receiving unit. As a result, it is possible to improve the qualities of a focus error signal, a tracking error signal, and a reproduction signal.

Further, in the optical head, preferably, the light beam dividing unit divides the incident light beam into a main beam and first and second sub-beams, and the light-receiving unit includes a main beam light-receiving unit for receiving the main beam, a first sub-beam light-receiving unit for receiving the first sub-beam, and a second sub-beam light-receiving unit for receiving the second sub-beam, and moreover a plurality of the light guides are each individually formed on light-receiving surfaces on light beam incident sides of the main beam light-receiving unit, the first sub-beam light-receiving unit, and the second sub-beam light-receiving unit, respectively.

With this configuration, a plurality of the light guides are each individually formed on light-receiving surfaces on light beam incident sides of the main beam light-receiving unit, the first sub-beam light-receiving unit, and the second sub-beam light-receiving unit, respectively. For this reason, it is possible to largely reduce a stray light. Further, it becomes possible to reinforce the portion of the package except for a plurality of the light guides. Accordingly, it is possible to improve the strength of the package, which can reduce the dimensions of the package. As a result, it is possible to more downsize the optical head.

Further, in the optical head, it is preferable that each shape of the light guides is a circular shape. With this configuration, the shape of the light guide is a circular shape. For this reason, it is possible to match the shape of each light guide to the shape of the light incident on the light-receiving unit. Accordingly, it is possible to more reduce the size of the light guide.

Still further, in the optical head, it is preferable that each shape of the light guides is a non-circular shape. With this configuration, the shape of the light guide is a non-circular shape. For this reason, it is possible to match the shape of each light guide to the shape of the light-receiving unit. Accordingly, it is possible to more reduce the stray light incident on the light-receiving unit.

Furthermore, in the optical head, it is preferable that the package is formed of a resin. With this configuration, the package is formed of a resin. For this reason, it is possible to reduce the weight of the optical head, and it is possible to form a plurality of light guides on the package with ease.

Whereas, in the optical head, it is preferable that the package is formed of silicone. With this configuration, the package is formed of silicone. For this reason, it is possible to prevent the quality deterioration of the package due to irradiation with a blue light having a wavelength of, for example, 405 nm.

Further, in the optical head, it is preferable that the package is formed of any of a resin, glass, and a metal, and that a plurality of the light guides include an opening formed in any of the resin, the glass, and the metal.

With this configuration, an opening is formed in the package formed of any of the resin, the glass, and the metal. As a result, it is possible to form a plurality of light guides with ease.

Still further, in the optical head, it is preferable that the package is formed of either a resin or glass, and that the light shield includes either a metal film or an optical film formed on a surface of either the resin or the glass.

With this configuration, a region except for a plurality of the light guides is shielded from light by any of a metal film and an optical film formed on a surface of any of the resin and the glass. For this reason, it is possible to prevent the deterioration of the quality of the package. As a result, it is possible to implement an optical head more excellent in reliability.

Still further, in the optical head, it is preferable that the light beam dividing unit is disposed between the objective lens and the astigmatism causing unit, and divides a reflected light beam reflected at the information recording medium.

With this configuration, by the light beam dividing unit disposed between the objective lens and the astigmatism causing unit, the reflected light beam reflected at the information recording medium is divided. Accordingly, it is possible to detect a tracking error signal by a 1-beam method, a so-called APP (advanced push-pull) method.

Furthermore, in the optical head, it is preferable that the light beam dividing unit is disposed between the light source and the objective lens, and divides a light beam emitted from the light source.

With this configuration, by the light beam dividing unit disposed between the light source and the objective lens, the light beam emitted from the light source is divided. Accordingly, it is possible to detect a tracking error signal by a 3-beam method, a so-called DPP (differential push-pull) method.

Whereas, in the optical head, it is preferable that the light detector further includes a computation unit for performing a prescribed computation on an electric signal obtained by photoelectrically transducing the reflected light beam received at the light-receiving unit, that the package covers the computation unit, and that the light shield entirely blocks a light beam incident on the computation unit.

With this configuration, the computation unit performs a prescribed computation on an electric signal obtained by photoelectrically transducing the reflected light beam received at the light-receiving unit. The package covers the computation unit. The light shield entirely blocks the light beam incident on the computation unit. Therefore, it is possible to completely block the stray light incident on the computation unit. Accordingly, it is possible to reduce the noise generated due to the incidence of the light beam on the computation unit. As a result, it is possible to generate a stable focus error signal, tracking error signal, and reproduction signal.

Further, in the optical head, preferably, the light detector further includes a computation unit for performing a prescribed computation on an electric signal obtained by photoelectrically transducing the reflected light beam received at the light-receiving unit, and the package covers the computation unit, with this computation unit including a first computation circuit for generating a focus error signal, a second computation circuit for generating a tracking error signal, and a third computation circuit for generating a reproduction signal of the information recording medium, and moreover the package further having an opening formed on a circuit surface on a light beam incident side of the third computation circuit.

With this configuration, the computation unit performs a prescribed computation on an electric signal obtained by photoelectrically transducing the reflected light beam received at the light-receiving unit. The package covers the computation unit. Then, the first computation circuit generates a focus error signal. The second computation circuit generates a tracking error signal. The third computation circuit generates a reproduction signal of the information recording medium. The package further has an opening formed on a circuit surface on a light beam incident side of the third computation circuit.

Therefore, the opening is formed on the circuit surface on the light beam incident side of the third computation circuit for generating a reproduction signal. For this reason, when the package disposed on the top part of the computation unit is formed of a metal film, the frequency response of the reproduction signal generated by the third computation circuit can be prevented from being reduced by the load capacity which the metal film has.

Further, in the optical head, it is preferable that a plurality of the light guides formed on the light-receiving surface on the light beam incident side of the light-receiving unit, and the opening formed on the circuit surface on the light beam incident side of the third computation circuit are formed with mutually different materials and methods.

With this configuration, a plurality of the light guides formed on the light-receiving surface on the light beam incident side of the light-receiving unit, and the opening formed on the circuit surface on the light beam incident side of the third computation circuit are formed with mutually different materials and methods. For this reason, it is possible to form the optimum light guides and openings according to the purpose. As a result, it is possible to downsize and enhance the performance of the optical head.

An optical head in accordance another aspect of the present invention is an optical head for reproducing information from an information recording medium having two or more recording layers. The optical head includes a light source for emitting a light beam; an objective lens for converging the light beam emitted from the light source to the information recording medium; an astigmatism causing unit for causing an astigmatism in a reflected light beam reflected at the information recording medium; and a light detector for detecting the reflected light beam including the astigmatism caused therein by the astigmatism causing unit. The light detector includes: a light-receiving unit for receiving the reflected light beam, and a computation unit for performing a prescribed computation on an electric signal obtained by photoelectrically transducing the reflected light beam received at the light-receiving unit, and a package for covering the light-receiving unit and the computation unit. The computation unit includes a first computation circuit for generating a focus error signal, a second computation circuit for generating a tracking error signal, and a third computation circuit for generating a reproduction signal of the information recording medium. The package has an opening formed on a circuit surface on a light beam incident side of the third computation circuit, and a light shield for shielding a region except for the opening from light.

With this configuration, the light source emits a light beam. The objective lens converges the light beam emitted from the light source to the information recording medium. The astigmatism causing unit causes an astigmatism in a reflected light beam reflected at the information recording medium. The light detector detects the reflected light beam including the astigmatism caused therein by the astigmatism causing unit. The light detector includes: a light-receiving unit for receiving the reflected light beam, and a computation unit for performing a prescribed computation on an electric signal obtained by photoelectrically transducing the reflected light beam received at the light-receiving unit, and a package for covering the light-receiving unit and the computation unit. The computation unit includes a first computation circuit for generating a focus error signal, a second computation circuit for generating a tracking error signal, and a third computation circuit for generating a reproduction signal of the information recording medium. Then, the package has an opening formed on a circuit surface on a light beam incident side of the third computation circuit, and a light shield for shielding a region except for the opening from light.

Therefore, the opening is formed on the circuit surface on the light beam incident side of the third computation circuit for generating a reproduction signal. For this reason, when the package disposed on the top part of the computation unit is formed of a metal film, the frequency response of the reproduction signal generated by the third computation circuit can be prevented from being reduced by the load capacity which the metal film has.

An optical information device in accordance with a still other aspect of the present invention includes the optical head according to any of those described above, a driving unit for rotatably driving an information recording medium, and a control unit for controlling the optical head and the driving unit. With this configuration, it is possible to apply the optical head to the optical information device.

Incidentally, specific embodiments or examples made in the section of Description of Embodiments are absolutely for clarifying the technical contents of the present invention, and should not be construed in a narrow sense as limited only to such specific examples, and can be carried out in variously modified forms within the spirit of the present invention and the scope of the appended claims.

INDUSTRIAL APPLICABILITY

The optical head and the optical information device in accordance with the present invention are useful as external storage devices of computers having a stable tracking control function, and a function capable of implementing a low information error rate, implementing recording or reproduction of information with respect to a multilayer media of BD, and stable in recording performance and reproduction performance, and the like. Further, the optical head and the optical information device in accordance with the present invention are also applicable to video recording devices such as an optical disc recorder, video reproduction devices such as an optical disc player, or the like. Still further, the optical head and the optical information device in accordance with the present invention are also applicable to a car navigation system, a portable music player, a digital still camera, and a digital video camera.

The invention claimed is:
1. An optical head for reproducing information from an information recording medium having two or more recording layers, the optical head comprising:
   a light source for emitting a light beam;
   an objective lens for converging the light beam emitted from the light source to the information recording medium;

an astigmatism causing unit for causing an astigmatism in a reflected light beam reflected at the information recording medium;

a light beam dividing unit for dividing an incident light beam; and a light detector for detecting the reflected light beam including the astigmatism caused therein by the astigmatism causing unit, wherein the light detector includes:

a light-receiving unit for receiving the reflected light beam;

a package for covering the light-receiving unit; and a film deposited on a surface of the light detector, wherein the film has a plurality of light guides for guiding the reflected light beam to the light-receiving unit, and a light shield for shielding a region except for a plurality of the light guides from light, wherein the light beam dividing unit divides the incident light beam into a main beam, a first sub-beam, and a second sub-beam, wherein the light-receiving unit includes a main beam light-receiving unit for receiving the main beam, a first sub-beam light-receiving unit for receiving the first sub-beam, and a second sub-beam light-receiving unit for receiving the second sub-beam, wherein the plurality of the light guides are each individually formed on light-receiving surfaces on light beam incident sides of the main beam light-receiving unit, the first sub-beam light-receiving unit, and the second sub-beam light-receiving unit, respectively, and wherein the first sub-beam light-receiving unit and the second sub-beam light-receiving unit are each disposed at a position where an other-layer stray light is not incident.

2. The optical head according to claim 1, wherein each shape of the plurality of light guides is a circular shape.

3. The optical head according to claim 1, wherein each shape of the plurality of light guides is a non-circular shape.

4. The optical head according to claim 1, wherein the package is formed of a resin.

5. The optical head according to claim 4, wherein the package is formed of silicone.

6. The optical head according to claim 1, wherein the package is formed of any of a resin, glass, and a metal, and wherein the plurality of the light guides include an opening formed in any of the resin, the glass, and the metal.

7. The optical head according to claim 1, wherein the package is formed of either a resin or glass, and wherein the light shield includes either a metal film or an optical film formed on a surface of either the resin or the glass.

8. The optical head according to claim 1, wherein the light beam dividing unit is disposed between the objective lens and the astigmatism causing unit, and divides the reflected light beam reflected at the information recording medium.

9. The optical head according to claim 1, wherein the light beam dividing unit is disposed between the light source and the objective lens, and divides the light beam emitted from the light source.

10. The optical head according to claim 1, wherein the light detector further includes a computation unit for performing a prescribed computation on an electric signal obtained by photoelectrically transducing the reflected light beam received at the light-receiving unit wherein the package covers the computation unit, and wherein the light shield entirely blocks a light beam incident on the computation unit.

11. The optical head according to claim 1, wherein the light detector further includes a computation unit for performing a prescribed computation on an electric signal obtained by photoelectrically transducing the reflected light beam received at the light-receiving unit, wherein the package covers the computation unit, wherein the computation unit includes a first computation circuit for generating a focus error signal, a second computation circuit for generating a tracking error signal, and a third computation circuit for generating a reproduction signal of the information recording medium, and wherein the package further has an opening formed on a circuit surface on a light beam incident side of the third computation circuit.

12. The optical head according to claim 11, wherein the opening formed on the circuit surface on the light beam incident side of the third computation circuit is formed with mutually different materials and methods.

13. An optical information device, comprising:

the optical head according to claim 1, a driving unit for rotatably driving an information recording medium, and a control unit for controlling the optical head and the driving unit.

14. An optical head for reproducing information from an information recording medium having two or more recording layers, the optical head comprising:

a light source for emitting a light beam;

an objective lens for converging the light beam emitted from the light source to the information recording medium;

an astigmatism causing unit for causing an astigmatism in a reflected light beam reflected at the information recording medium; and a light detector for detecting the reflected light beam including the astigmatism caused therein by the astigmatism causing unit, wherein the light detector includes:

a light-receiving unit for receiving the reflected light beam;

a computation unit for performing a prescribed computation on an electric signal obtained by photoelectrically transducing the reflected light beam received at the light-receiving unit; and a package for covering the light-receiving unit and the computation unit, wherein the computation unit includes a first computation circuit for generating a focus error signal, a second computation circuit for generating a tracking error signal, and a third computation circuit for generating a reproduction signal of the information recording medium, wherein the first computation circuit, the second computation circuit, and the third computation circuit are formed on a same surface as the light-receiving unit, and wherein the package has an opening formed only on a circuit surface on a light beam incident side of the third computation circuit out of the first computation circuit, the second computation circuit, and the third computation circuit, and a light shield for shielding a region except for the opening from light.

* * * * *